(12) United States Patent
Bucciarelli

(10) Patent No.: US 12,190,400 B2
(45) Date of Patent: *Jan. 7, 2025

(54) SYSTEM AND METHOD FOR MONITORING ELECTRONIC COMMUNICATIONS

(71) Applicant: Todd Bucciarelli, Hinsdale, IL (US)

(72) Inventor: Todd Bucciarelli, Hinsdale, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,174

(22) Filed: Aug. 14, 2023

(65) Prior Publication Data

US 2023/0385975 A1 Nov. 30, 2023

Related U.S. Application Data

(63) Continuation of application No. 17/664,552, filed on May 23, 2022, now Pat. No. 11,756,142, which is a continuation of application No. 17/000,996, filed on Aug. 24, 2020, now Pat. No. 11,354,764, which is a continuation-in-part of application No. 16/194,748, filed on Nov. 19, 2018, now Pat. No. 10,755,370, which is a continuation of application No. 14/466,586, filed on Aug. 22, 2014, now Pat. No. 10,157,435.

(60) Provisional application No. 61/959,395, filed on Aug. 22, 2013.

(51) Int. Cl.
*H04L 51/21* (2022.01)
*G06Q 50/26* (2012.01)
*H04L 67/50* (2022.01)
*H04W 4/14* (2009.01)
*H04W 4/16* (2009.01)

(52) U.S. Cl.
CPC .......... *G06Q 50/265* (2013.01); *H04L 51/21* (2022.05); *H04L 67/535* (2022.05); *H04W 4/14* (2013.01); *H04W 4/16* (2013.01)

(58) Field of Classification Search
CPC ........ H04W 4/14; H04W 4/16; H04L 61/5084
USPC .......................... 709/203, 220, 224, 226, 228
See application file for complete search history.

(56) References Cited

U.S. PATENT DOCUMENTS

| | | | |
|---|---|---|---|
| 8,131,281 B1 * | 3/2012 | Hildner | H04L 63/30 455/418 |
| 8,140,062 B1 * | 3/2012 | Hildner | H04W 12/069 455/418 |
| 8,146,062 B2 * | 3/2012 | Andrews | G06F 9/454 717/136 |
| 8,214,471 B2 | 7/2012 | Doshi et al. | |
| 8,373,538 B1 * | 2/2013 | Hildner | H04W 12/126 340/3.1 |
| 8,761,661 B2 | 6/2014 | Brisebois et al. | |

(Continued)

FOREIGN PATENT DOCUMENTS

| | | | | |
|---|---|---|---|---|
| CA | 2499361 C | 10/2012 | | |
| WO | WO-2014004911 A2 * | 1/2014 | ............. | G05B 11/01 |

*Primary Examiner* — Khanh Q Dinh

(74) *Attorney, Agent, or Firm* — Greer, Burns & Crain, Ltd

(57) ABSTRACT

A method for monitoring mobile communication and generating alerts associated with targeted content. A monitored user's mobile communication device forwards an incoming or outgoing communication to a monitoring user's mobile communication device. The monitored user's or monitoring user's mobile communication device generates an alert if it is determined that the incoming or outgoing communication contains targeted content, and an alert is provided on the monitoring user's mobile communication device.

17 Claims, 28 Drawing Sheets

(56) References Cited

U.S. PATENT DOCUMENTS

| | | |
|---|---|---|
| 8,891,086 B2 | 11/2014 | Knopp et al. |
| 8,897,757 B2 | 11/2014 | Epp et al. |
| 8,913,734 B2 | 12/2014 | Thange |
| 8,988,215 B1 | 3/2015 | Trundle et al. |
| 9,042,921 B2 | 5/2015 | Karmarkar |
| 9,141,276 B2 | 9/2015 | Dawes et al. |
| 9,158,890 B2 | 10/2015 | Meredith |
| 9,515,378 B2 | 12/2016 | Prasad |
| 9,578,159 B2 | 2/2017 | Muthukumar |
| 9,754,097 B2 | 9/2017 | Hessler |
| 10,157,435 B2 | 12/2018 | Bucciarelli |
| 10,425,671 B2 | 9/2019 | Archibong et al. |
| 10,755,370 B2 | 8/2020 | Bucciarelli |
| 11,354,764 B2 * | 6/2022 | Bucciarelli ............ H04L 51/21 |
| 2004/0229635 A1 | 11/2004 | Hertz |
| 2006/0025122 A1 | 2/2006 | Harris et al. |
| 2006/0194596 A1 * | 8/2006 | Deng ..................... H04L 51/58 |
| | | 455/466 |
| 2009/0031006 A1 | 1/2009 | Johnson |
| 2009/0102712 A1 | 4/2009 | Heffez |
| 2009/0144823 A1 | 6/2009 | Lamastra et al. |
| 2010/0231928 A1 | 11/2010 | Valdez |
| 2011/0035284 A1 | 2/2011 | Moshfeghi |
| 2011/0059730 A1 | 3/2011 | Scriven et al. |
| 2011/0065419 A1 * | 3/2011 | Book .................... H04W 12/37 |
| | | 455/410 |
| 2011/0250895 A1 | 10/2011 | Wohlert et al. |
| 2012/0089470 A1 * | 4/2012 | Barnes, Jr. ............ H04M 1/724 |
| | | 705/16 |
| 2012/0096490 A1 * | 4/2012 | Barnes, Jr. ............ G06Q 10/02 |
| | | 725/34 |
| 2012/0115434 A1 | 5/2012 | Lazaridis |
| 2012/0244794 A1 | 9/2012 | Brisebois et al. |
| 2013/0084834 A1 | 4/2013 | Tivyan et al. |
| 2013/0095801 A1 | 4/2013 | Kermoian |
| 2013/0150004 A1 * | 6/2013 | Rosen ............... H04M 3/42357 |
| | | 455/418 |
| 2013/0170664 A1 | 7/2013 | Schwager |
| 2013/0237142 A1 | 9/2013 | Brisebois et al. |
| 2013/0267279 A1 | 10/2013 | Marui et al. |
| 2013/0331073 A1 | 12/2013 | Balan et al. |
| 2014/0073291 A1 * | 3/2014 | Hildner ............... H04W 12/126 |
| | | 455/411 |
| 2014/0128032 A1 | 5/2014 | Muthukumar |
| 2014/0281929 A1 | 9/2014 | Grossman et al. |
| 2015/0244699 A1 | 8/2015 | Hessler |
| 2015/0358790 A1 | 12/2015 | Nasserbakht |

* cited by examiner

Figure 3

Target content example data structure

| Content for comparison | Denotes type of content | Description of text string/image |
|---|---|---|
| GNOC | String | Get Naked On Camera |
| Cocaine | String | Drug substance |
| "audio clip with the word sex contained in it" | Audio | Audio communication with the word sex |
| "picture of female nipple " | Image | Female nipple |
| "video clip with sex object" | Video | Video communication showing a sex object |
|  |  |  |

Depiction of real-time SMS or text message monitoring

Depiction of real-time SMS or text message monitoring outgoing messages

Example monitoring user interface with monitored text messages (Matching connecting lines (solid, dashed, dashed dot) denote authenticated communication channels.)

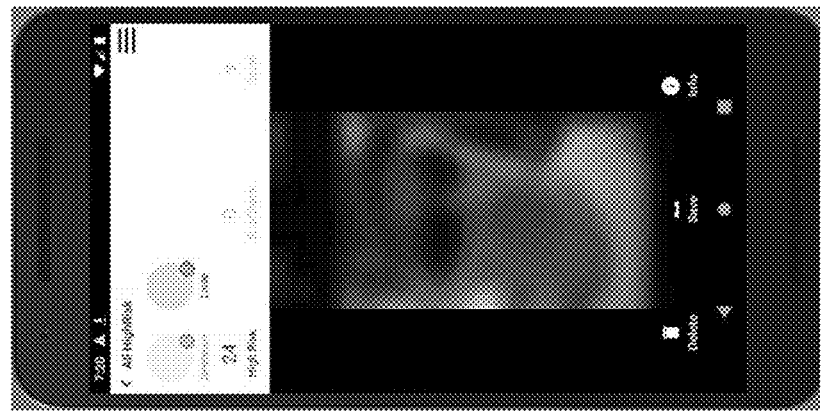
Single Image View
Figure 27
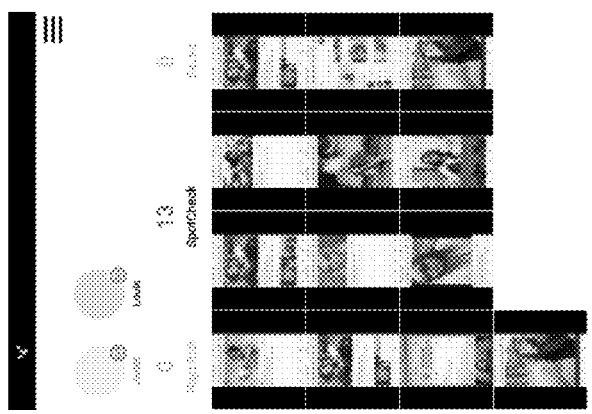
Gallery View

SYSTEM AND METHOD FOR MONITORING ELECTRONIC COMMUNICATIONS

PRIORITY CLAIM AND REFERENCE TO RELATED APPLICATION

This application is a continuation of U.S. patent application Ser. No. 17/664,552, filed May 23, 2022, and incorporated in its entirety by reference herein. U.S. patent application Ser. No. 17/664,552 is a continuation of U.S. patent application Ser. No. 17/000,996, filed Aug. 24, 2020, now U.S. Pat. No. 11,354,764 and incorporated in its entirety by reference herein. U.S. patent application Ser. No. 17/000,996 is a continuation-in-part of U.S. patent application Ser. No. 16/194,748, filed Nov. 19, 2018, now U.S. Pat. No. 10,755,370 and incorporated in its entirety by reference herein. U.S. patent application Ser. No. 16/194,748 is a continuation of U.S. patent application Ser. No. 14/466,586, filed Aug. 22, 2014, now U.S. Pat. No. 10,157,435 and incorporated in its entirety by reference herein. This application also claims priority to and the benefit of U.S. Provisional Patent Application Ser. No. 61/959,395, filed Aug. 22, 2013, entitled "METHODS AND SYSTEMS FOR MOBILE COMMUNICATION MONITORING AND ALERTS." U.S. Provisional Patent Application Ser. No. 61/959,395 is incorporated in its entirety by reference herein.

FIELD OF THE INVENTION

A field of the invention is mobile communications. Particular embodiments of the invention are applicable to monitoring electronic communications between mobile communication devices.

BACKGROUND OF THE INVENTION

Short Message Service (SMS) is a text messaging service component of phone, web, or mobile communication systems, using standardized communications protocols that allow the exchange of text messages (currently up to 160 characters for SMS, though this could change in the future) between fixed line, mobile phone devices or mobile communication devices. Current communication protocols used to deliver such services include GSM, CDMA, GPRS; 3G networks such as W-CDMA, EDGE or CDMA2000 and 4G networks, though additional protocols and networks may be implemented. Text messaging is a widely used communications service provided by wireless carriers (e.g. U.S. Cellular), communication companies (e.g. AT&T) and mobile app companies (e.g. Whatsapp, KiK).

Multimedia Messaging Service, or MIMS, is a standard way to send messages that include multimedia content (images, video, etc.) to and from mobile phones and mobile communication devices. It extends the core SMS (Short Message Service) capability that currently allows exchange of text messages only up to 160 characters in length. A popular use of MMS is to send photographs from camera-equipped handsets, although it is also popular as a method of delivering news and entertainment content including videos, pictures, text pages and ringtones. The standard is developed by the Open Mobile Alliance (OMA), although during development it was part of the 3GPP and WAP groups.

Text messages, images (pictures), video and audio can be transmitted using Wi-Fi, Bluetooth or other wireless technology over the Internet and without use of cellular communication infrastructure. As such, SMS and MIMS are emulated by mobile applications ("Mobile Apps") that provide this type of functionality. Additional functionality such as audio, video and audio/video content can be transmitted and received with these types of Mobile Apps.

Though electronic messaging such as, but not limited to, SMS, MIMS and text messaging (i.e. via mobile apps) has been widely adopted and has proven very useful, the inherent dangers of electronic messaging and related communications such as cyber-bullying, the transmission and receiving of sexual images ("sexting") and other inappropriate or other targeted content have been well publicized. The present inventor has recognized that the need to monitor these types of communications during cell phone (more specifically, what is commonly referred to as a "smartphone") or mobile communication device use is becoming increasingly more important.

Other growing issues related to the private usage of mobile communications devices such as, but not limited to, laptop computers, tablet PCs (tablet computer), gaming devices, cell phones, PDAs (Personal Data Assistants) and other communication devices is with unsolicited contact by predators to children, facilitation of illegal drug and alcohol activities, and the malicious broadcasting of content intended to be private. Due to the portability of mobile communications devices such as cell phones, children (and people) have regular opportunities to engage in electronic messaging such as text message exchanges that have inappropriate or illegal content unbeknownst to their parents.

Many parents and guardians that have children with mobile communication devices (e.g. cell phones or other devices that enable text messaging) are interested in protecting their children from the inherent dangers and ramifications associated with inappropriate or undesirable text messaging communications described herein. However, the present inventor has recognized that such parents or guardians are unable to easily or effectively monitor the content being transmitted and received on their children's cell phones or other devices that enable text messaging and electronic communications. This is due in part to the lack of transparency, anonymity and the mobile nature of cell phones and other hand-held (mobile) communication devices.

Text messages, images, video and audio can also be transmitted and received directly over the Internet using a Wi-Fi, Bluetooth or via other technologies that enables mobile communication devices to connect wirelessly to the Internet. To this end, mobile applications (mobile apps) now exist that emulate SMS and MIMS functionality.

In general, it has been recognized that users (e.g. parents, guardians and family member) of mobile communication devices (for example but not limited to SMS and MMS messages communicated via a handheld smartphone such as a BlackBerry, iPhone, cellular phone running an Android operating system or another portable computing device capable of receiving and/or sending wireless communications) face concerns regarding various aspects of communications to/from such mobile communication devices. Examples of this include the appropriateness, inappropriateness, safety and legality of such communications. For example, people (such as parents or guardians of children) may be concerned about the language, the meaning of acronyms, the meaning of shorthand, content, pictures and/or elements included in the child communications.

Some example systems and methods of the present invention address one or more of these concerns by providing preferably near real-time monitoring of text messaging to address these and other related problems and issues.

SUMMARY OF THE INVENTION

An example embodiment of the invention provides, among other things, a method for monitoring mobile communication and generating alerts associated with targeted content. In an example method, a link is established between monitoring user's mobile communication device and a monitored user's mobile communication device to receive communications for monitoring purposes. In some example embodiments, the monitoring user's mobile communication device is authenticated to receive communications from a monitored user's mobile communication device (e.g., for monitoring purposes). The monitored user's mobile communication device forwards an incoming or outgoing electronic communication to the monitoring user's mobile communication device. The monitored user's or monitoring user's mobile communication device generates an alert if it is determined that the incoming or outgoing electronic communication contains targeted content. The alert is provided on the monitoring user's mobile communication device, e.g., displayed, sounded, presented via haptic feedback, etc. In some embodiments, the targeted content associated with the alert and/or a description of the target content (e.g. description of an acronym) may be provided on the monitoring user's mobile communication device for review by the monitoring user.

BRIEF DESCRIPTION OF THE DRAWINGS

The foregoing and other features, aspects and advantages of the invention are described in detail below with reference to the drawings of various embodiments, in which:

FIG. 3 is an example of a portion of a data structure for use in accordance with some embodiments.

FIG. 27 shows example screenshots of a user interface of a monitoring user's mobile communication device after receiving transmitted content.

DETAILED DESCRIPTION

Figure 1:
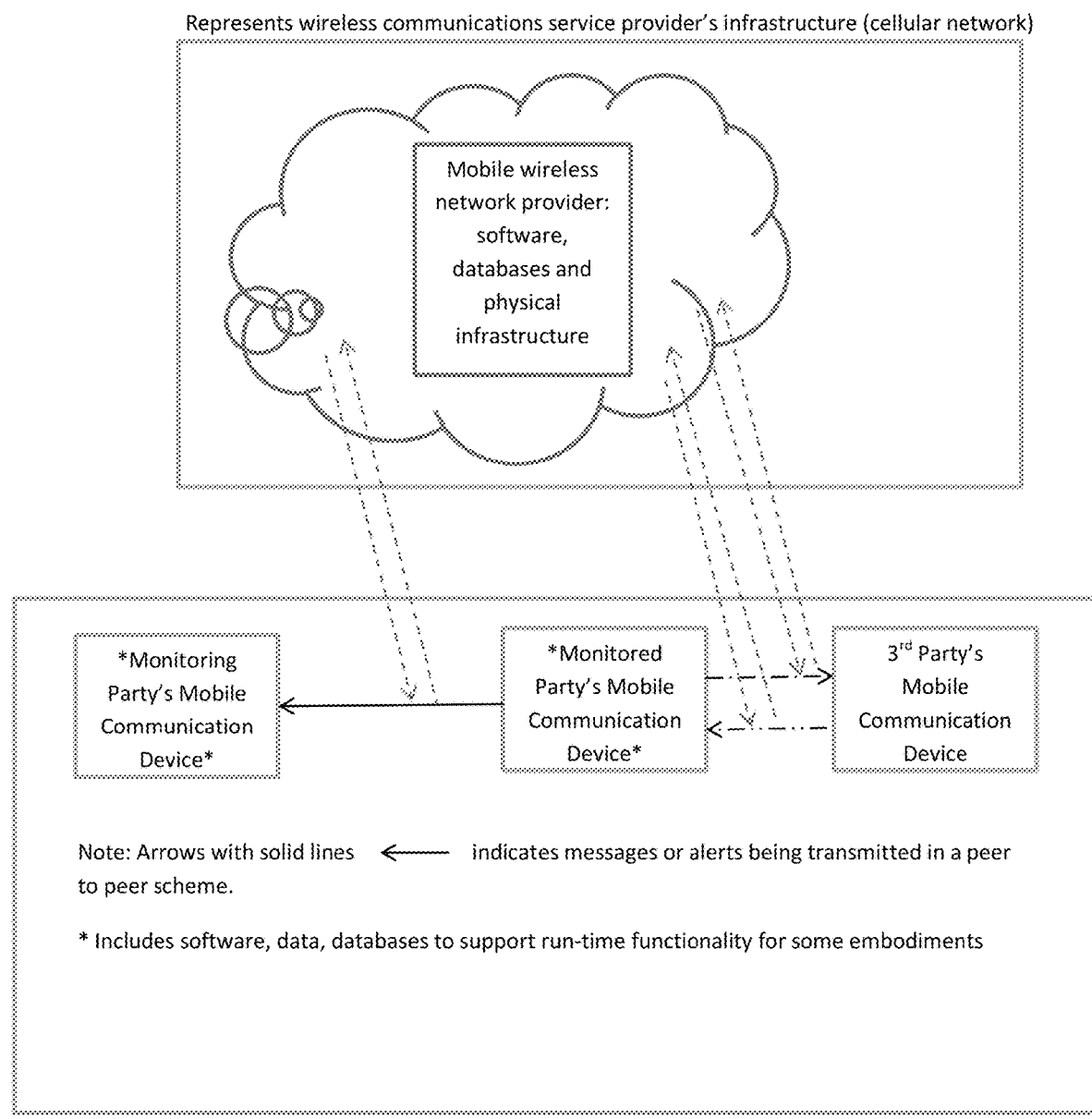
FIG. 1 is a schematic diagram of an embodiment for facilitating wireless communication among communication devices, in accordance with some embodiments.

Example embodiments of the invention provide, among other things, systems and methods for monitoring electronic communications. Such systems and methods in example embodiments further provide alerts of particular targeted content, such as inappropriate or illegal content, within electronic communications. Example systems and methods can provided for monitoring a single user, or multiple users, and can be performed by a single monitoring user or by multiple monitoring users. Non-limiting examples of mobile communication devices include cell phones, smartphones, iPhones, Windows phones, Samsung cell phones, Android phones, cell phones that have memory and processor(s), cell phones that run a mobile operating system such as Android, webOS, iOS, Blackberry OS, Symbian, Windows Mobile Professional, tablet computers, iPads, iPods, PDAs (Personal Digital Assistant) or other portable communication devices. Future mobile communication devices may include technologies under development such as Google Glass, smartphones incorporating cloud-based technologies or cloud-based operating systems or cloud-based computing schemes.

As used herein, the terms text message, text messages or text messaging is intended to include SMS (Short Message Service), MIMS (Multimedia Messaging Service) and other types of electronic messaging services or applications including but not limited to those that transmit text, text strings, characters and/or multimedia over the Internet via a Wi-Fi, Bluetooth or other wireless technology connection. Future messaging services that utilize other electronic data transmission technologies, for example X-ray, RF (Radio Frequency), infrared, visible light, ultraviolet and gamma rays technologies or cloud computing technologies or schemes (e.g. cloud messaging), may be applicable to some embodiments herein.

Mobile communications devices include, but are not limited to, Personal Digital Assistants (PDAs), cell phones, mobile phones, Smartphones, iPods, iPads, gaming devices, mobile computers, Tablet PCs and any other electronic device for which transmitting and receiving text messages are frequently utilized (also referred to herein as a mobile communication device). Example embodiments described herein refer to cell phones, however, such description is intended to also apply, where feasible, to mobile communication devices generally.

As used herein, the term software, mobile application, mobile app is intended to mean either software or firmware. Note that a mobile app may be downloaded and installed on a smartphone or mobile communication device whereby a smartphone or mobile communication device may have hardware or chips that have the software (application code) programmed into them. In the case firmware, the software is essentially built into the hardware of the smartphone or mobile communication device (which does not need to be downloaded or installed). Additionally, it is also possible to incorporate software into the operating system of the smartphone or mobile communication device so that it is integrated into the smartphone or mobile communication device (not needing mobile app software to be downloaded and installed by the end user). It will be appreciated that description herein for example methods will likewise be applicable to suitably configured mobile communications devices, software or firmware (e.g., mobile apps), or networks or architectures (peer-to-peer or other networks) that perform one or more features of the method.

As used herein, the term "electronic message" or the term "electronic communication" is intended to mean any type of message that can be transmitted or received by a mobile communication device, including but not limited to a text message, SMS, image (picture), MMS, audio clip, video clip, audio/video clip, live audio segment, live video segment or electronic message.

In an example method for monitoring mobile communication and generating alerts associated with targeted content, such as potentially inappropriate or illegal content, a link is established between a user's mobile communication device to be monitored and a user's mobile communication device to receive communications for monitoring purposes. The devices may also be authenticated or registered, though such authentication is not required in all embodiments. The monitoring user's (also referred to herein as monitoring party or monitoring party's) mobile communication device ("monitoring device") receives communication (i.e. via message forwarding), either incoming or outgoing, from a user's (also referred to herein as monitored party or monitored party's) mobile communication device being monitored (monitored device). In some example embodiments, only incoming, or alternatively only outgoing, communications are monitored.

The monitored user's mobile communication device generates and transmits an alert to the user's mobile communication device monitoring the communications if the application software running on the monitored user's mobile communication device determines that a communication contains targeted content. Determining whether a communication contains targeted content can be accomplished, for example, by comparing the content of the communication to a library of targeted content, such as inappropriate and/or illegal violations, stored in a local database (or data structure) including text strings, images, audio clips and video clips. Example software can search for exact matches or comparable matches (e.g. comparable match could be an image in the local database that resembles the image in a communication) within the local database to determine if it should generate an alert to be transmitted to the monitoring user's mobile communication device. The alert is provided, e.g., displayed, sounded, provided via haptic feedback, etc. on the monitoring mobile communication device.

For example, the monitoring user's mobile communication device can receive alerts transmitted (forwarded) from a monitored user's mobile communication device when potentially inappropriate or illegal content is determined by the software after searching a local database (or data structure) of predefined text strings and/or images and/or audio clips and/or video clips residing on the user's mobile communication device being monitored.

In a particular example method, the communications between the monitored user and the monitoring user is implemented in a peer-to-peer network scheme (i.e. peer-to-peer architecture). For example, run-time software of a mobile application resides (is installed) on all monitoring and monitored mobile communication devices. The monitored mobile communication device's run-time software forwards text messages, MMS or other electronic communications to the monitoring mobile communications device's run-time software and not to an intermediary server. In this way, an example implementation of some embodiments need not require an intermediary or centralized server (or servers) to carry out its run-time functionality. Servers may be implemented for downloading example software (e.g., mobile app) to mobile communication devices and uploading keywords and/or images and/or audio clips to the local database or data structure on the monitored user's mobile communication device (non-run-time activities). However, during the run-time execution of the software providing the communication monitoring and alerts, no intermediary or centralized servers are necessary by the example application software to provide this functionality.

It should be noted that the mobile communications service providers (i.e. Verizon, AT&T, T-Mobile, etc.) may use servers to implement their specific services for SMS, MIMS, voice mail, live voice communication or instant messaging (IM), however this level of communication for an example implementation of the invention is preferably carried out as a request from the application software to the operating system of the mobile communication device, which then requests service to receive an interrupt pertaining to a new incoming text message or outgoing text message, from the mobile communication device's operating system. Another example implementation is to incorporate polling to look for new activity occurring in the communication buffers for text messages, MIMS or other types of electronic communications. Mobile network (cellular network) providers include services for SMS and MMS by incorporating SMSC (Short Messaging Service Center) and/or MSC (Multimedia Messaging Service Center) in there network elements.

Another embodiment provides, among other things, a method for monitoring mobile communication including reading and storing each character input by a monitored user when entering in information on a monitored mobile communication device (e.g. keyboard/keyboard device, on-screen keyboard, voice input, pointing device). The character inputs are analyzed and/or parsed for a text message style communication that utilizes the Internet for a transmission network (rather than a SMSC or MMSC type network). The content of the text strings (i.e. contiguous characters stored that where input by the user) stored by the software that is intended for another user to read or see (e.g. text message, images) is transmitted to the monitoring user's mobile communication device.

In an example embodiment, the monitored user's mobile communication device receives characters input on the monitored user's mobile communication device and analyzes/parses the character strings for text message style communications (the portion of the characters that comprise a message or image to be read/viewed by another user) to be compared against a list of predefined text strings, images and video clips that are deemed to be targeted content, e.g., inappropriate or illegal content, for a direct match or a comparable match. Provided a direct match or comparable match is determined, then the character string or image that may have the target content is transmitted (forwarded) to the monitoring user's mobile communication device. In another example embodiment, provided a direct match or comparable match is determined, the example software generates an alert that is transmitted (sent) to the monitoring user's mobile communication device.

In an example embodiment, the information about the names of the applications (mobile app) running on the monitored mobile communication device can be read from the device's operating system and used by the software as intelligence as to what text messaging type software (Whatsapp, KiK, Snapchat) is being used by the monitored user. Based on this information, the format of the character strings and images being communicated to other mobile communication devices can be more readily determined. For example, Snapchat allows multimedia (for example, pictures) to be transmitted from one party's smartphone to another party's smartphone whereby the user's receiving the pictures on their smartphone will only be able to view them for a designated period of time and then they are no long accessible. This embodiment would, for example, enable a monitoring user to receive a copy of and store such pictures for viewing at their convenience.

An example system and method works with two or more mobile communication devices (particular non-limiting examples including IPHONE, BLACKBERRY, SAMSUNG GALAXY). At least one mobile communication device is the device being monitored ("Monitored Device") and at least one additional mobile communication device is the device conducting the monitoring ("Monitoring Device"). The monitoring and monitored mobile communication devices all have application software (e.g., an app) downloaded, installed and running on the devices in order to implement the functionality. In addition, data is stored in a database or data structures on the monitored mobile communication device for supporting the application software.

An example application software for monitoring mobile communications provides various functions, such as:

1) the forwarding of communications on the monitored mobile communication device(s) to the monitoring mobile communication device(s). It should be noted that a monitored mobile communication device can be monitored by more than one monitoring mobile communication devices and that a monitoring mobile communication device can monitor multiple monitored mobile communication devices;

2) the generation and transmission of alerts when the application software on a monitored mobile communication device determines that a communication has potentially inappropriate, illegal or target content. This function preferably utilizes a database or data structure of predefined text strings, images, audio clips and video clips stored on the monitored mobile communication device (or on the monitoring mobile communications device);

3) the forwarding of characters or images generated by the monitored mobile communication device as the user types (or otherwise enters in) characters, one by one, on a character input mechanism, an example for which is an on-screen keyboard or a physical keyboard, to the monitoring mobile communication device(s) or as the user creates images facilitated by the mobile communication device, an example for which is a picture taken using a camera integrated into a mobile phone. Voice recognition input mechanisms is another example of an input mechanism to a mobile communication device.

Additional embodiments provide, among other things, a method for monitoring mobile communication by reading and storing each image moved from memory to the image buffer of the mobile communication device (i.e. the operating system of the mobile communication device) by a monitored user (e.g. a picture/photograph to be sent to another user) to be stored by the software and transmitted (forwarded) to the monitoring user's mobile communication device. In this example method, the monitored user's mobile communication device moves an image from memory to the image buffer of the mobile communication device and compares that image to list of predefined images that are deemed to be targeted content, such as inappropriate, illegal or targeted content, for a direct match or a comparable match. Provided a direct match or comparable match is determined, then the image that may have the targeted content is transmitted (forwarded) to the monitoring user's mobile communication device. Alternatively or additionally, the monitored user's mobile communication device moves an image from memory to the image buffer of the mobile communication device and compares that image to list of predefined images that are deemed to be targeted content for a direct match or a comparable match. Provided a direct match or comparable match is determined, then the example software generates an alert that is transmitted (sent) to the monitoring user's mobile communication device.

Example embodiments provide methods and systems for monitoring and analyzing communications of a monitored user on behalf of a monitoring user, for transmitting communications (message forwarding) to monitoring users. Additionally, alerts of potentially inappropriate, illegal or targeted content are provided (transmitted) to the monitoring users. For example, text messages, SMS messages, MMS messages, IMs, e-mails, social network site postings or voice mails of a child may be monitored on behalf of a parent. In one embodiment, communications occurring on a child's communication device (cell phone, smartphone, iPod, iPad, etc.) are forwarded (transmitted) to one or more monitoring user(s).

Additionally, an algorithm can be used to analyze the communication for matches (or close similarities) to stored elements (for example, words, text strings, character strings, acronyms, images, audio clips, video clips) ("Stored Elements") in a database residing on the communication device being monitored, through a comparison process to assess the potential of targeted content, such as inappropriate or illegal content. The Stored Elements preferably are updated and uploaded periodically to maintain up-to-date information in the local database (note that this is an operation that need not be executed as part of some embodiments' run-time functionality, e.g., the upload does not negate an example peer to peer scheme). One reason for the updates is to stay current with the latest acronyms and shorthand used during text messaging (SMS messages) by children. New acronyms with potentially inappropriate or illegal content are created by users frequently. For example, currently the acronym GNOC has been known to mean "Get Naked On Camera". When the algorithm determines that the communication has a match or close similarity to a match, it will generate an alert that is transmitted (sent) to the monitoring user's communication device. In another example, when comparing an image from the monitored user's mobile communication device to the Stored Elements, the comparison process may use a close proximity match to determine if the image contains sexual content. Although there may not be a direct match, it can be determined that through a close proximity comparison algorithm, for example, that an image should be categorized as sexual in its nature.

Although there are many applications for different embodiments, one example application enables parents to monitor text messages from their cell phone, smartphone or mobile communication device occurring on their children's cell phones, smartphones or other mobile communications devices. This includes monitoring outgoing messages (e.g. text messages) sent by the child and incoming messages (e.g. text messages) being transmitted to the child's cell phone (or communication device) by forwarding the messages to the parent's cell phone, smartphone or mobile communication device. The monitoring (or the viewing of these messages) occurs on the parent's cell phone, smartphone or mobile communication device through a mobile app that is installed on the parent's device and child's device.

In one embodiment, for security purposes, authentication (or registration) may be performed between the monitoring device and the monitored device ("remote cell phone") to be monitored, prior to any text messages or electronic communications being forwarded (transmitted) to the monitoring device. In one embodiment, this is accomplished through a request sent by the monitoring device (or devices) to a cell phone, smartphone or mobile communication device to be monitored (monitored device), e.g., a remote cell phone. The person with the remote cell phone must accept this request to validate the monitoring party's cell phone, smartphone or mobile communication device and acknowledge that the monitoring party will have the capability to monitor text messages and other electronic communications occurring on their cell phone, smartphone or mobile communication device.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Although several embodiments, examples and illustrations are disclosed below, it will be understood by those of ordinary skill in the art that the invention(s) described herein extend(s) beyond the specifically disclosed embodiments, examples and illustrations and includes other uses of the invention(s) and obvious modifications and equivalents thereof. Embodiments of the invention(s) are described with reference to the accompanying figures. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Certain aspects, advantages, and novel features are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Figure 2:
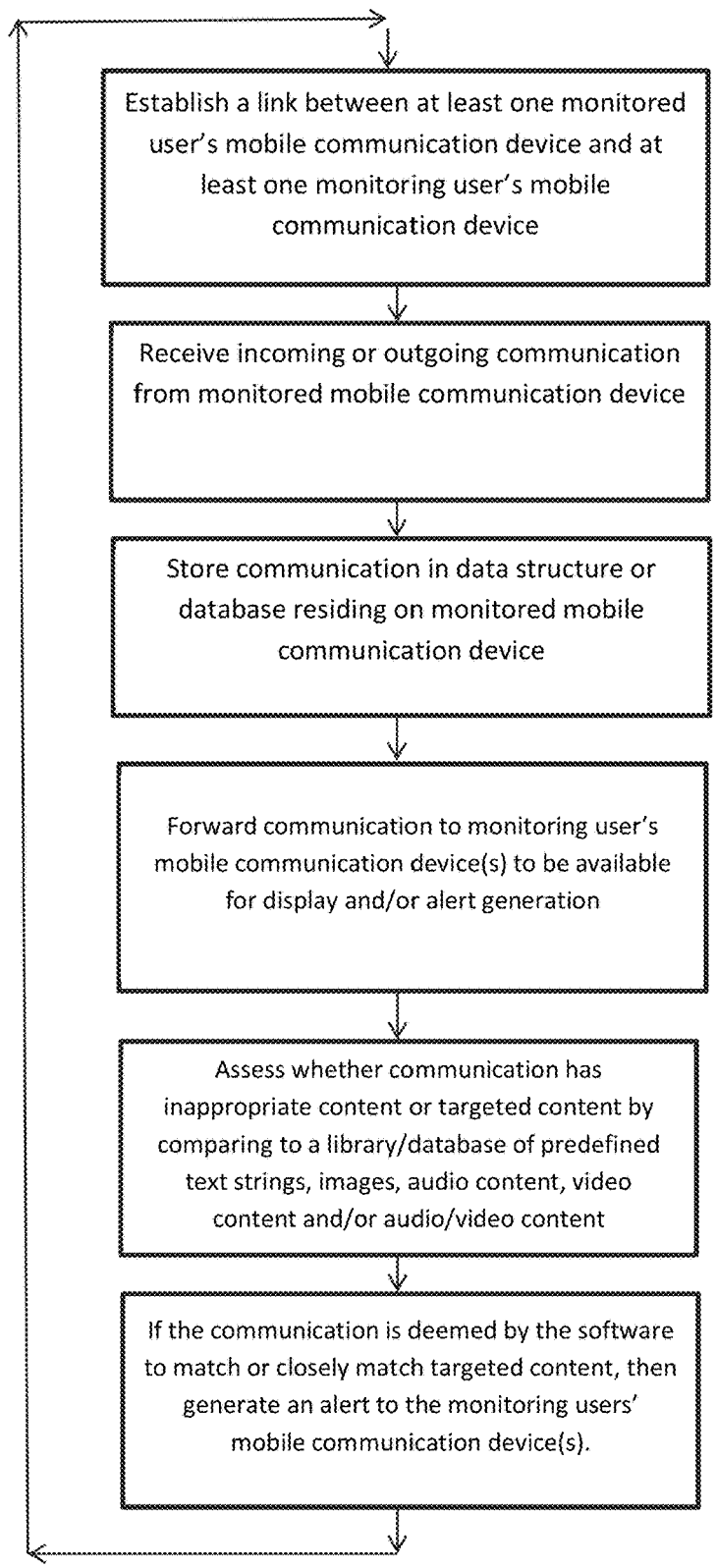
FIG. 2 shows a block diagram of a method for monitoring communications on mobile communication devices and generating alerts in accordance with some embodiments.

FIG. 1 is a schematic diagram of an embodiment of a system for facilitating wireless communication among communication devices, in accordance with some embodiments. FIG. 1 shows an example of software (mobile app) communicating directly to other mobile communication devices in a peer to peer scheme and utilizing a mobile wireless provider's SMS/MMS infrastructure (i.e. cellular network). This illustrates a mobile wireless communication provider's infrastructure utilized to support some embodiments. FIG. 1 further shows an example of application level software (mobile app) according to particular embodiments. In FIG. 1, arrow with solid line indicates messages being transmitted to the monitoring party in a peer to peer scheme at the application level. Alerts or warnings are also transmitted to the monitoring party's mobile communication device in a peer to peer scheme whereby the software, data and databases necessary to carry out the run-time functionality of some embodiments reside on the monitoring and monitored mobile communication devices and do not require logging into an intermediary server to access the information provided by such embodiments FIG. 2 shows a block diagram representing a method for monitoring of communications on mobile communication devices in accordance with some embodiments. In FIG. 2, communications are obtained from one or more mobile communication devices being monitored (a "Monitored Device") and such communications are forwarded to one or more other mobile communication devices authenticated to monitor such communications (a "Monitoring Device"). Additionally, should the communications be determined to contain targeted content, such as potentially inappropriate or illegal content, than an alert will also be transmitted to the mobile communication devices authenticated to monitor the Monitored Device.

Before or concurrently with monitoring, a link is preferably established between the monitoring user's mobile communication device and the monitored user's mobile communication device. This link can be established, for instance by the software requesting and receiving a monitored user's mobile communication devices (e.g., ID number, phone number, etc.), sending and receiving (e.g., accepting) a message from one or more of the devices to another one or more of the devices, handshaking, etc. Establishing the links can be accompanied by authentication or registration in some embodiments. Such links can be peer to peer or other direct link, server based, established during installation for one or both of the devices, or in other manners. Such establishing of a link can be, but need not be, performed prior to or concurrently with any of the example methods provided herein.

FIG. 3 shows an example portion of a data structure with stored text strings, images, audio clips and video clips for the generation of alerts. The example data structure may be in a database with a library (dictionary) of text strings, images, video clip and audio clips to be used when the software (mobile app) of an embodiment of this invention analyzes communications (e.g. SMS, MMS messages, voice mail) for targeted content, such as inappropriate or illegal content, for the generation of alerts to be transmitted from the mobile communication device. The data structure can be part of a database (or standalone) for which some embodiments use as a reference to determine, through direct match or analyzed for a close proximity match, if communications are deemed to be potentially inappropriate or illegal and warrant an alert (notice or warning) to be generated and transmitted to monitoring parties (e.g. an alert sent to a parent's mobile communication device when potentially inappropriate content was detected on their child's mobile communication device). Example alerts that can be provided include but are not limited to, one or more of the following: icon on the status bar of a monitoring mobile communication device's user interface/main screen, icon displayed at any designated location on a monitoring mobile communication device user interface, pop up message, text message, SMS, MIMS, image, audio clip, live audio message, video clip, live video message, audio/video clip, live audio/video message, vibration, instant message or any type of notification that can be incorporated with a mobile communication device (of a monitoring user).

An example of a close proximity match is determining if an image in a communication (e.g. MIMS) matches that of an image in the data structure/database that contains predefined text strings, images, audio clips and video clips of potential inappropriate or illegal content. Content analysis may incorporate image comparison, matrix comparison, raster comparison, pixel comparison, facial recognition algorithms/software/services or any other technique, software, utility, service or computational model used to determine that an image is a close match to a defined or target content (PerceptualDiff utility, currently available via the Internet at pdiff.sourceforge.net, is a particular, non-limiting example).

A specific, non-limiting example application monitors a MIMS communication that has a picture of a female breast. The MMS communication is compared to similar images in the data structure or database for a reasonable match (close proximity match). If the software deems there is a reasonable match, then an alert may be generated and transmitted, for example, to the monitoring parties (e.g. parent) indicating that an electronic message with potential sexual content was detected. The concept of children engaging in the transmission/receipt of sexually explicit images on smartphones ("Sexting") activities has become an issue with mobile communications, and such activity between a minor and an adult is currently illegal in the United States.

Preferably, example systems and methods accomplish their run-time functionality for providing monitoring capabilities and alerts through a peer to peer network scheme (i.e. peer to peer network architecture). Advantages to the peer to peer network scheme for this example application include but are not limited to the following:
1) Ease of use—There is no need to login to a server through a web-browser on a cell phone, smartphone, mobile communication device, computer, PC, tablet PC or any other computing device that can browse the Internet in order to access text messages being monitored. Example embodiments use application software (mobile app) that runs (is executed) on the monitoring and monitored cell phones hardware directly and receives and stores the text messages being monitored in the memory (database) of the monitoring cell phone, smartphone or mobile communication device hardware directly and not on an intermediary or centralized server.
2) Better data security for the text messages being monitored—Being that all the text messages being forwarded (transmitted) to the monitoring cell phone, smartphone or mobile communication device are stored exclusively on the monitoring party's cell phone, smartphone or mobile communication device and not on a remote server or intermediary server, the potential for a security breach from an outside party is greatly reduced.
3) Real-time monitoring—This technology enables the monitoring party to receive the text messages and alerts on their cell phone, smartphone or mobile communication device in near real-time (approximately at the time they occur on the child's cell phone, smartphone or mobile communication device) and without any additional latency (delays) introduced by a server-based architecture (i.e. two-tier architecture, client/server architecture).

In other words, no servers are needed to display the text messages provided by the real-time text message monitoring feature and alerts of such example run-time embodiments. Servers may be implemented to upload the application software (mobile app) or data to a mobile communication device, For example, uploading the most recent, up-to-date list of text strings, images, audio clips and video clips to the data structure or database containing targeted content. Servers may be implemented by services utilized, for which a specific non-limiting example is services of a cellular communications service provider or also known as wireless communications service provider (FIG. 1).

To further clarify this point, the application software, data, databases and signaling/control information for implementing the run-time aspect of such example embodiments is self-contained on the cell phones, smartphones or mobile communication devices themselves and does not rely on an external server to facilitate or provide any aspect of its specific application functionality.

The example application software only needs to reside on at least one monitored mobile communication device (cell phone) and one monitoring mobile communication device (cell phone) (in any suitable distribution) in order to provide the functionality of this technology, though it can reside on multiple devices if desired. In other words, the technology's application software preferably resides on a minimum of one cell phone (displaying the text messages, pictures, electronic communications and alerts, being monitored) and a minimum of one cell phone whose text messages are being monitored and forwarded to the cell phone that is doing the monitoring. The near real-time monitoring function in such example embodiments is implemented as a peer to peer network scheme (architecture) and does not require an intermediary server (e.g. application server) for executing its functionality for monitoring electronic communications (e.g. text messages) or providing alerts. In this context, the example application software operates in a peer to peer network scheme implementing direct node to node communication when issuing a command to transmit (forward) text messages or electronic communications from the monitored cell phone (mobile communication device) to the monitoring cell phone (mobile communication device) in contrast to a server-based network scheme whereby one or more cell phones (mobile communication devices) communicate with or transmit text messages or electronic communications to a computer server (that is not itself a cell phone, smartphone or mobile communication device). However, at least some embodiments may adopt some server based functionality.

Figure 4:
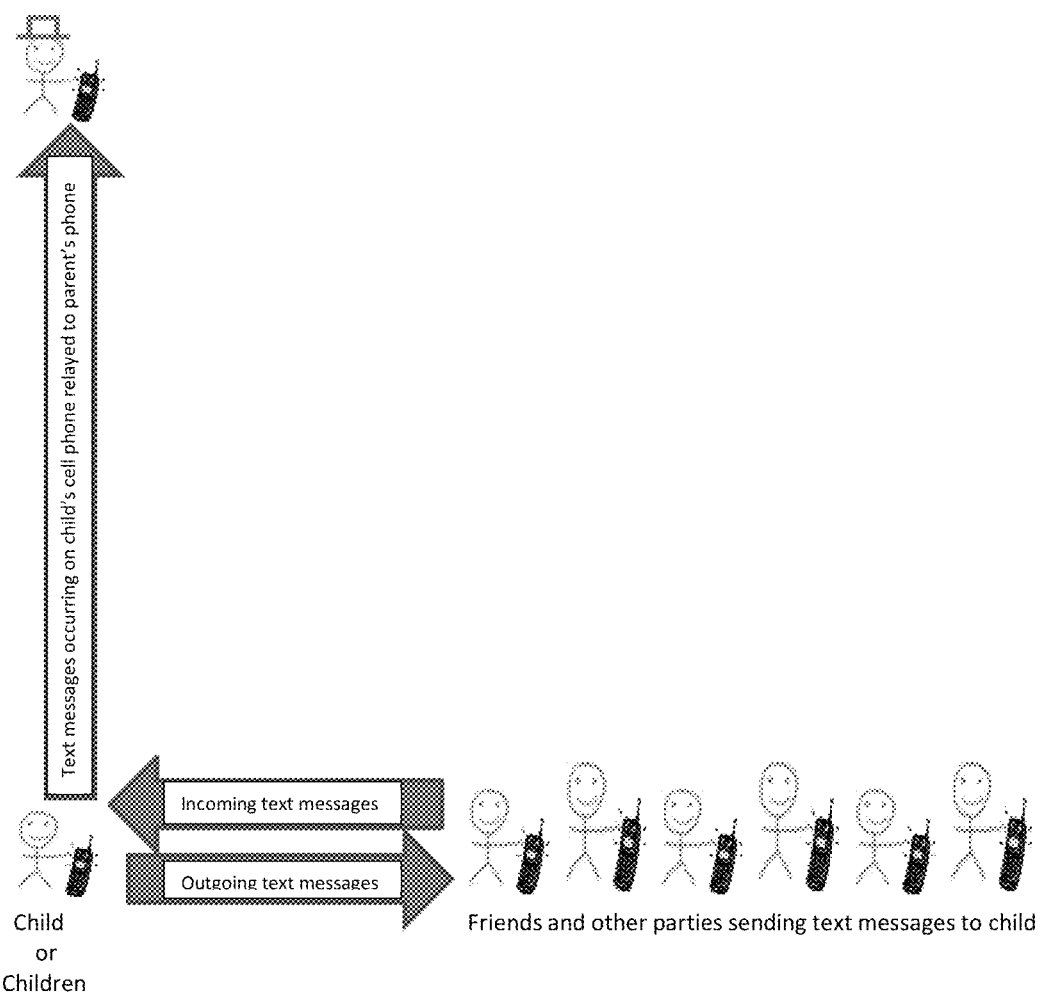
FIG. 4 is a depiction of an embodiment for a parent monitoring their child's/children's mobile communication device from their own mobile communication device by receiving copies of text messages coming into and going out of the child's mobile communication device. This embodiment could be viewed as a message forwarding scheme. More specifically, the software (mobile app) forwards incoming and outgoing text messages occurring on the child's mobile communication device to the parent's mobile communication device.

FIG. 4 shows a depiction of near real-time text message or SMS message monitoring for cell phones, smartphones or mobile communication devices. One example application may be a parent monitoring their child's/children's mobile communication device whereby the parent receives copies of text messages or SMS messages coming into (being received by) and going out (being transmitted out of) of the child's mobile communication device. Such an embodiment may be viewed as a message forwarding scheme.

Another way to view this is that the software (mobile app) in this embodiment forwards incoming and outgoing text messages or SMS messages from the child's mobile communication device ("monitored device") to the parent's mobile communication device ("monitoring device"). All text messages (incoming & outgoing) occurring on the child's cell phone (mobile communication device) are relayed (forwarded) to the parent's cell phone (mobile communication device) by the example mobile app. The data (e.g., text messages to be monitored) preferably are stored on the child's and parent's cell phone and not on an intermediary or centralized server. The mobile app preferably is installed on the parent's cell phone (mobile communication device) and the child's cell phone (mobile communication device) and contains the execution code (i.e. software), database(s), libraries and data (including text messages and electronic messages) to perform all operations necessary to carry out the functionality of example methods.

Although not illustrated by FIG. 4, monitoring of more than one cell phone (mobile communication device) to be monitored can be done from the same mobile app. Additionally, more than one monitoring party can monitor the same child or children. For security purposes, optional authentication or registration may be performed on the monitoring party's cell phone or to register the monitoring party's cell phone to the monitored party's cell phone prior to any text messages being relayed (sent).

Although the above embodiment provides distinct advantages for many applications as discussed, in some other applications use of a cloud computing, grid computing, autonomic computing configuration or other types of network or computing schemes may be useful.

Figure 5:
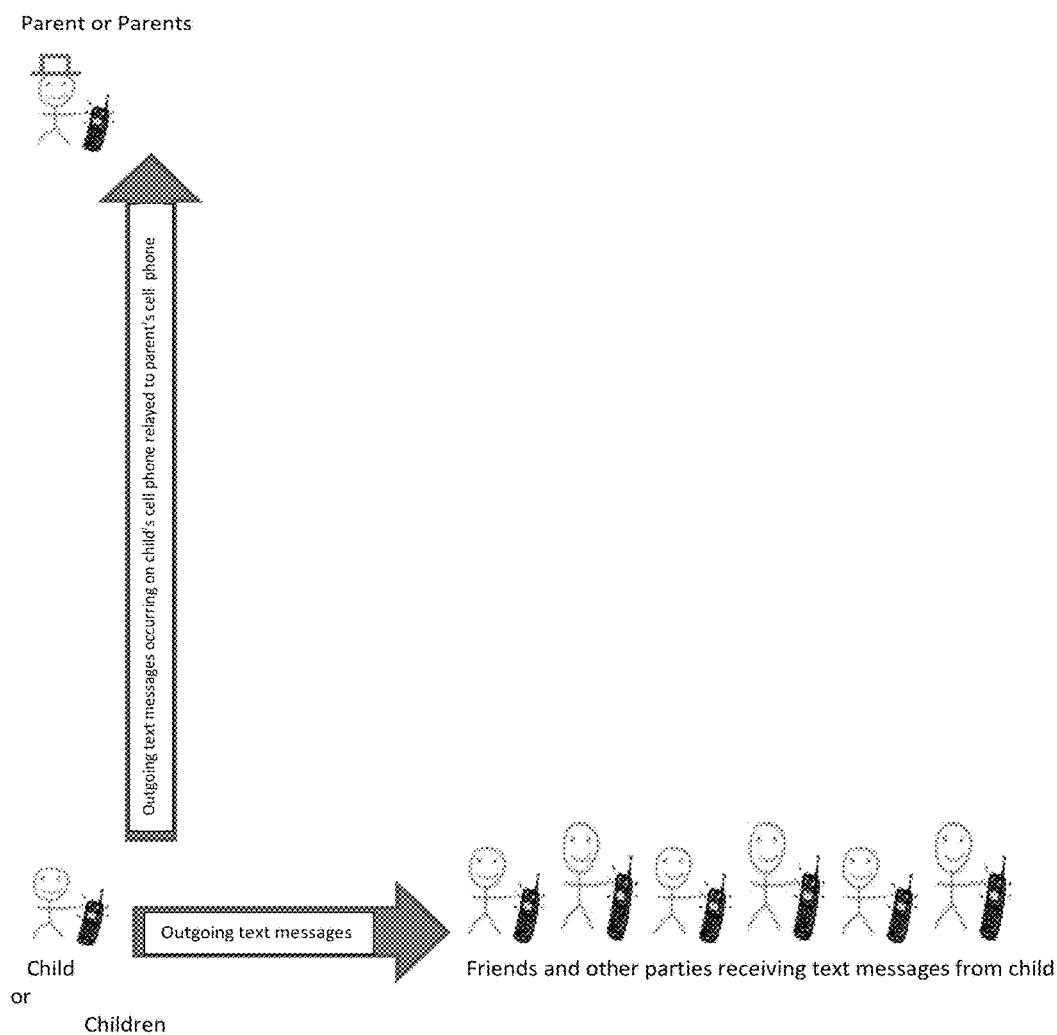
FIG. 5 is a depiction of an embodiment for a parent monitoring their child's/children's mobile communication device by receiving copies of text messages going out of the communication device. This embodiment could be viewed as a message forwarding scheme. More specifically, the software (mobile app) forwards outgoing text messages from the child's mobile communication device to the parent's mobile communication device.

FIG. 5 is a depiction of an embodiment for a parent monitoring their child's/children's mobile communication device by receiving copies of outgoing text messages or SMS being transmitted out of the communication device. This embodiment could be viewed as a message forwarding scheme. More specifically, the example software (mobile app) forwards outgoing text messages or SMS messages from the child's mobile communication device to the parent's mobile communication device. FIG. 5 illustrates near real-time SMS message (text message) monitoring for cell phones (e.g., "smartphones," or other mobile communication devices) of outgoing SMS messages (text messages), implemented as a peer-to-peer network architecture. All outgoing text messages occurring on the child's cell phone are relayed (sent) to the parent's cell phone by the mobile app. The data (text messages to be monitored) preferably are stored exclusively on the child's and parent's cell phone and not on an intermediary or centralized server. The example mobile app is installed on the parent's cell phone and the child's cell phone and contains the execution code, database, libraries and data (including text messages or electronic messages) to perform all operations necessary to carry out the functionality of some embodiment. Although not illustrated by this diagram, monitoring of more than one party's mobile communication device can be performed from a single monitoring mobile communication device. Additionally, more than one monitoring party's mobile communication device can monitor the same child's or children's mobile communication device (monitored mobile communication device). For security purposes, optional authentication or registration may be performed on the monitoring party's cell phone prior to any text messages or electronic messages being forwarded (transmitted).

Figure 7:
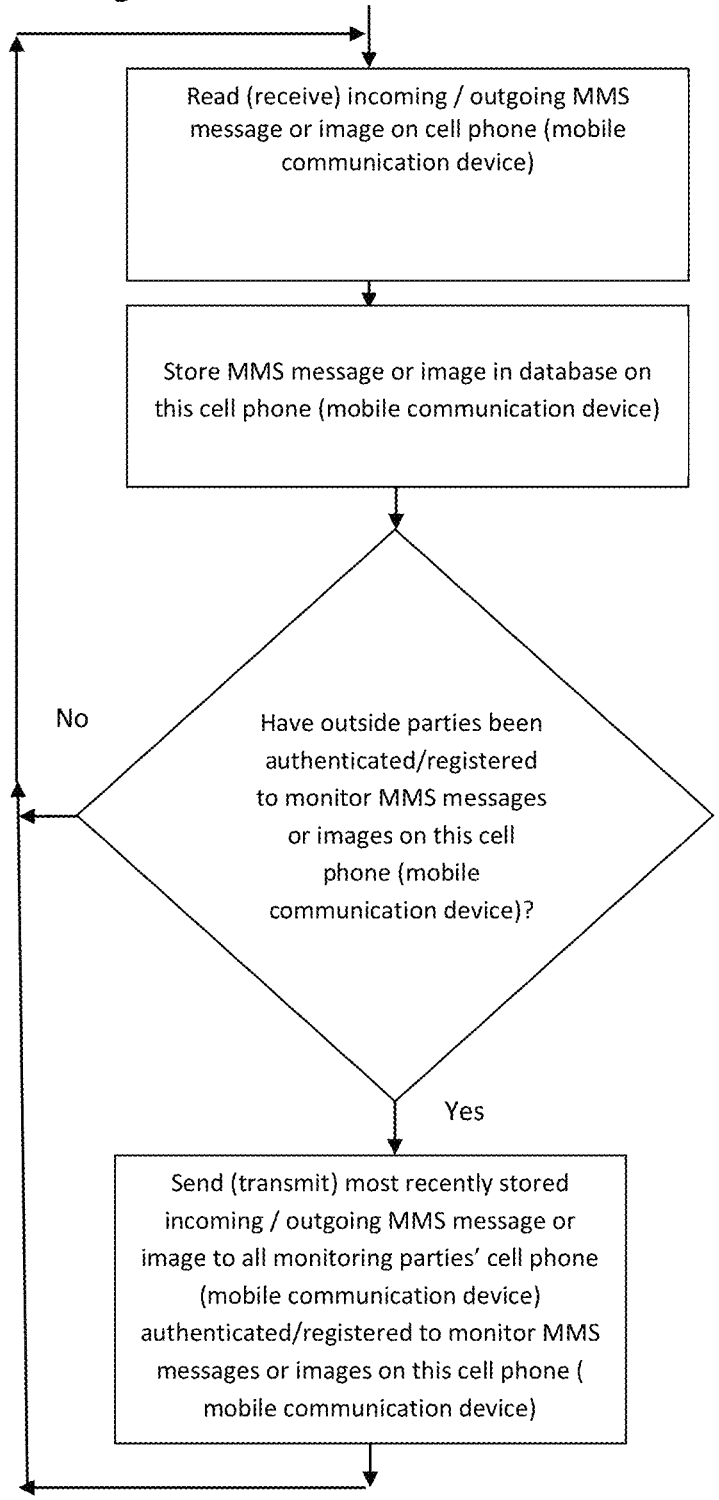
FIG. 7 is a flowchart illustrating an example process for providing copies of MIMS communications from a mobile communication device being monitored to one or more mobile communication devices authenticated or registered to monitor such communications in accordance with some embodiments.
Figure 8:
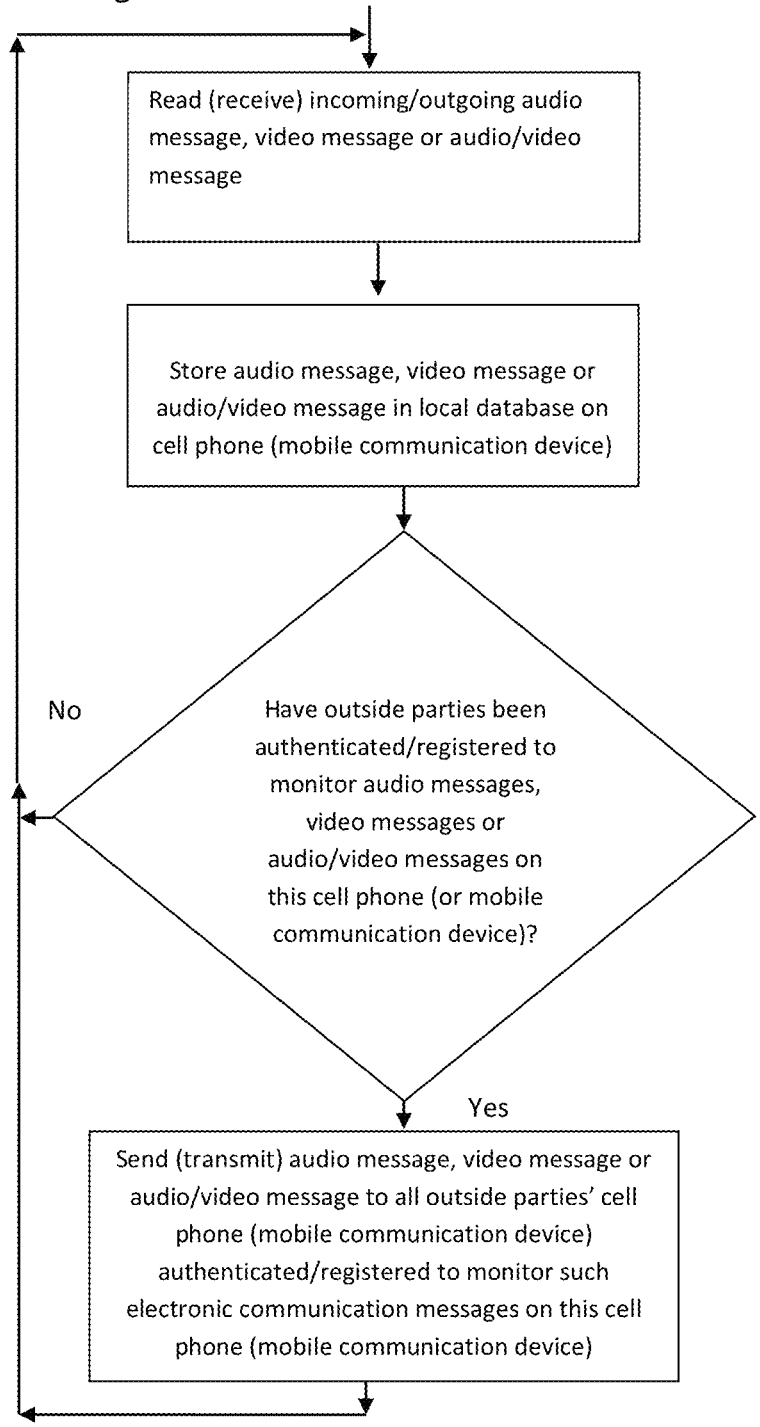
FIG. 8 is a flowchart illustrating an example process for providing copies of audio, video or audio/video communications from a mobile communication device being monitored to one or more mobile communication devices authenticated or registered to monitor such communications in accordance with some embodiments.
Figure 9:
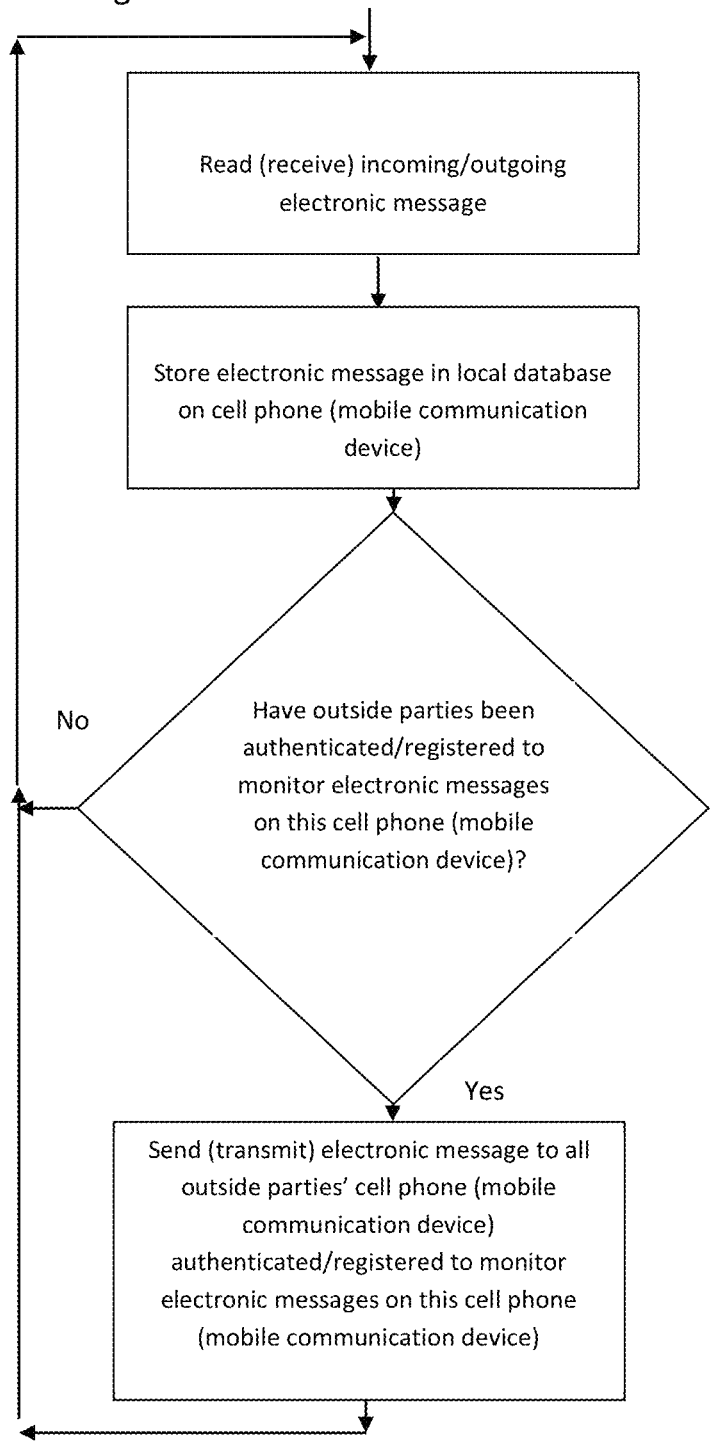
FIG. 9 is a flowchart illustrating an example process for providing copies of electronic messages from a mobile communication device being monitored to one or more mobile communication devices authenticated or registered to monitor such electronic messages in accordance with some embodiments.

Various example monitoring methods are shown in FIGS. 6-15. For instance, one particular example use for this technology, as a mobile application (mobile app), is to enable a parent to monitor the text messages occurring on their children's cell phones from their personal cell phone (e.g., FIG. 4). However, in addition to text message monitoring, this can enable the monitoring of other activities or features that can occur on a child's cell phone including but not limited to the monitoring of incoming and outgoing MMS messages (FIG. 7), images, audio messages, video messages, audio/video messages (FIG. 8) and other types of electronic messages (FIG. 9).

Other examples of monitoring functionality that this technology enables on cell phones, smartphones or mobile communication devices include, but are not limited to, cell phone conversations (voice phone calls) monitoring (monitoring cell phone numbers called/received), websites (URLs) visited, applications installed or uninstalled on a remote device, the turning on/off of the GPS or other location detecting technologies, features or services that may exist today or in the future on a remote cell phone (or communication device) to be used in identifying the location of the remote cell phone or communication device (e.g. to find the location of a child), other tracking features that can be used to proactively alert parents when a child travels beyond certain geographical boundaries or predefined limits related to geographical position and any or all statistics or metrics related to the aforementioned functions or any other functions that can be monitored on a cell phone, smartphone or mobile communication device. Some examples of statistics include: the number of text messages received from a particular contact, the number of text messages sent to a particular contact, which contacts communicated to the most to the child's cell phone (smartphone), the number of new contacts made during a particular timeframe, how many times a child left and entered a particular geographic zone (i.e. residence) and the associated dates and times, the number of times a particular website was visited, the number of new websites visited in a particular timeframe, and others.

Figure 6:
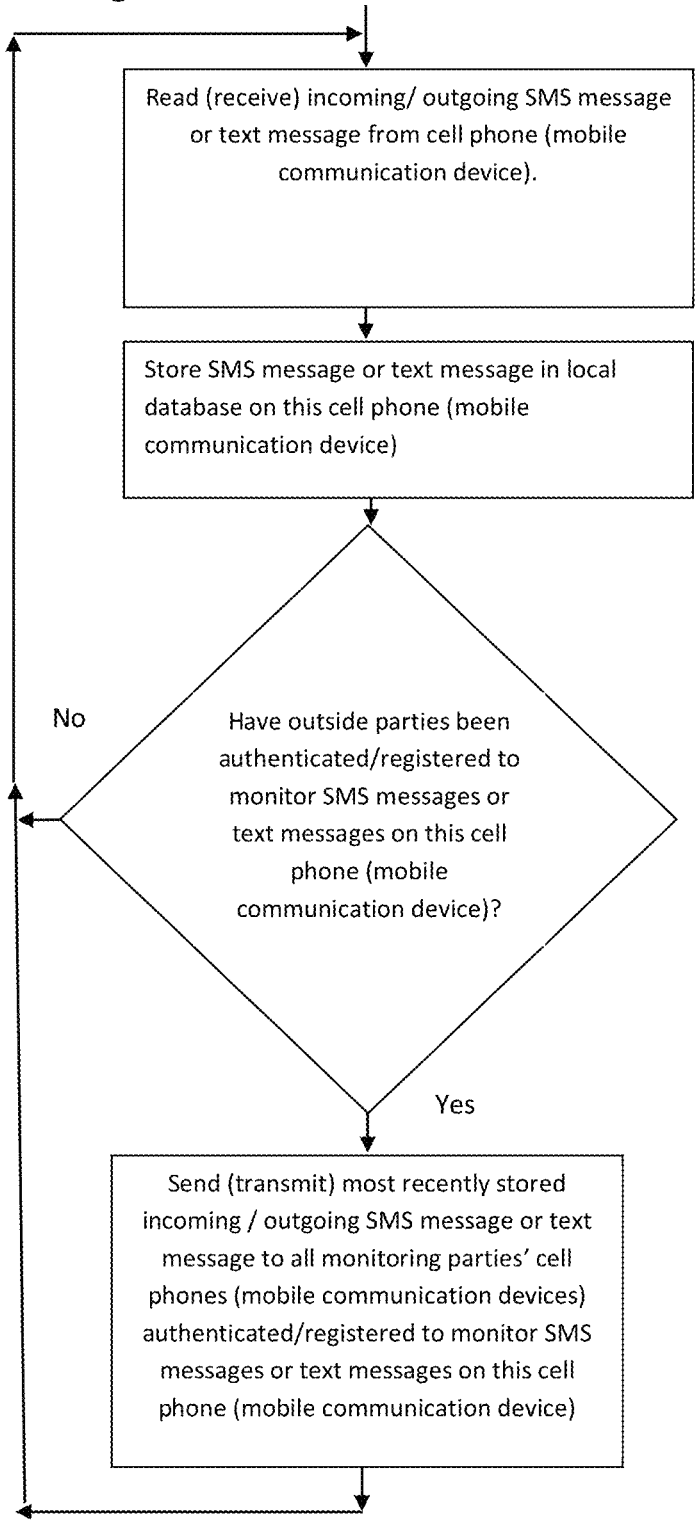
FIG. 6 is a flowchart illustrating an example process for providing copies of SMS communications from a mobile communication device being monitored to one or more mobile communication devices authenticated or registered to monitor such communications in accordance with some embodiments.

Particular example embodiments provide the near real-time monitoring of text messages, SMS or MIMS messages from a third party cell phone (the monitoring cell phone) for all incoming and outgoing text messages, SMS or MIMS messages occurring on a designated cell phone to be monitored (the remote cell phone) and any other mobile communication devices such as a smartphone, PDA, tablet PC or computer that can transmit and receive text messages, electronic messages, SMS or MMS messages via cellular technology, Internet technology or other types of data communication technologies that enable computers or mobile communication devices to communicate and share data existing today or in the future, as shown in FIGS. 4, 6, and 7.

FIG. 6 is a flowchart illustrating an example process for providing copies of SMS or text message communications from a mobile communication device being monitored to one or more mobile communication devices optionally authenticated to monitor such communications in accordance with some embodiments.

FIG. 7 is a flowchart illustrating an example process for providing copies of MIMS communications or images from a mobile communication device being monitored to one or more mobile communication devices optionally authenticated to monitor such communications in accordance with some embodiments.

FIG. 8 is a flowchart illustrating an example process for providing copies of audio, video or audio/video communications from a mobile communication device being monitored to one or more mobile communication devices optionally authenticated to monitor such communications in accordance with some embodiments.

FIG. 9 is a flowchart illustrating an example process for providing copies of any electronic message from a mobile communication device being monitored to one or more mobile communication devices optionally authenticated to monitor such electronic messages in accordance with some embodiments.

Figure 10:
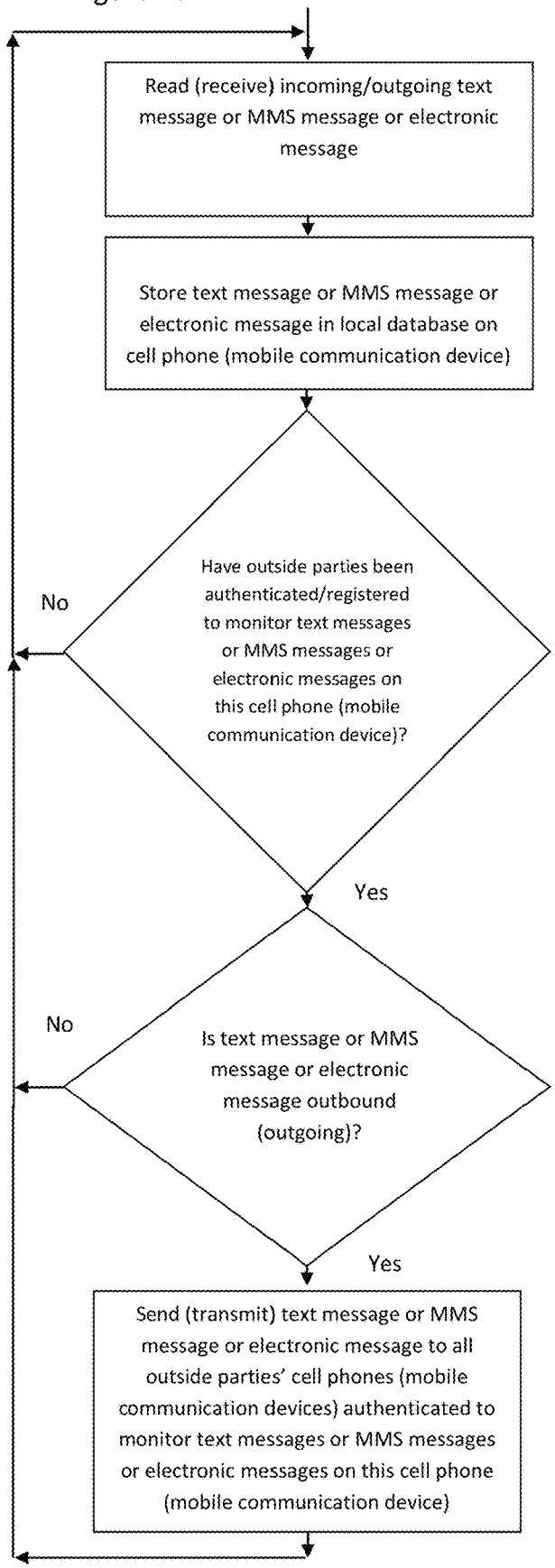
FIG. 10 is a flowchart illustrating an example process for providing copies of outgoing SMS, MMS or any electronic message from a mobile communication device being monitored to one or more mobile communication devices authenticated or registered to monitor such communications in accordance with some embodiments.
Figure 11:
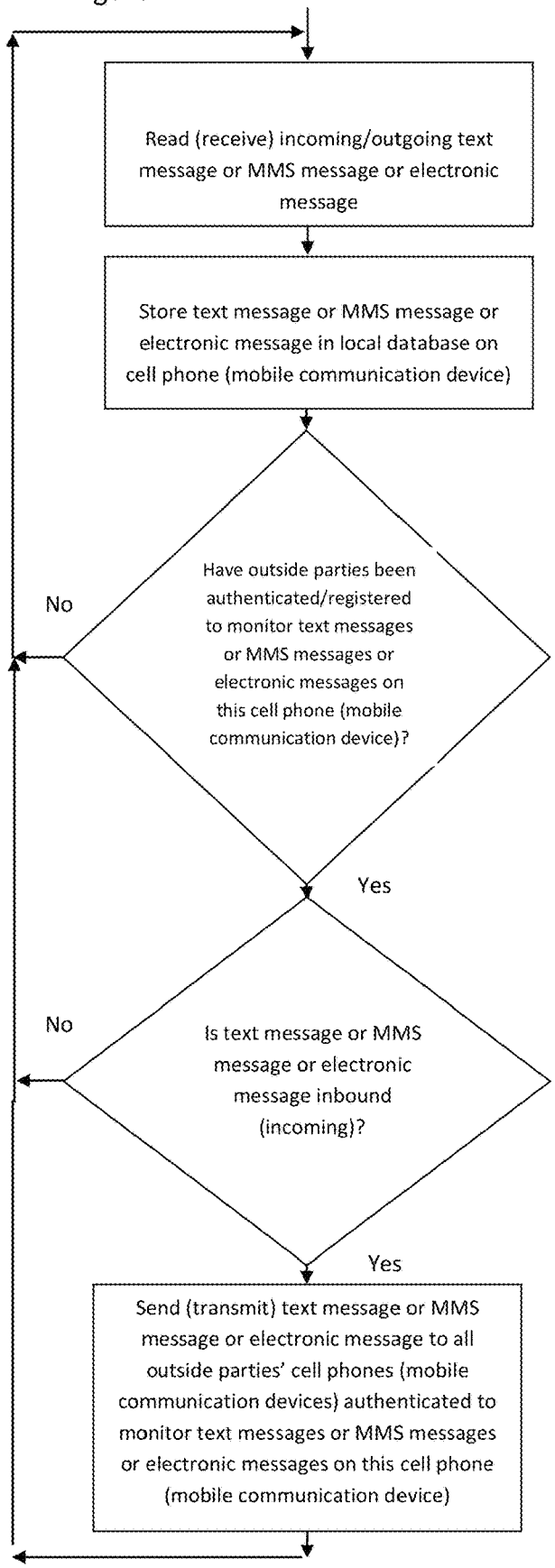
FIG. 11 is a flowchart illustrating an example process for providing copies of incoming SMS, MIMS or any electronic message from a mobile communication device being monitored to one or more mobile communication devices authenticated or registered to monitor such communications in accordance with some embodiments.

Another embodiment provides a method for transmitting only the incoming text messages, SMS, MIMS messages or any type of electronic message communication occurring on one or more mobile communication devices being monitored (e.g. child's cell phone) to a monitoring mobile communication device (FIG. 11). One example use would be for a parent to be able to monitor from their smartphone, text messages their child is receiving on their smartphone from one or more parties. FIG. 11 is a flowchart illustrating an example process for providing copies of incoming text messages, SMS, MMS or any electronic message communications from a mobile communication device being monitored to one or more mobile communication devices optionally authenticated to monitor such communications in accordance with some embodiments. FIG. 10 is a flowchart illustrating an example process for providing copies of outgoing text messages, SMS, MIMS or any electronic message communication from a mobile communication device being monitored to one or more mobile communication devices optionally authenticated to monitor such communications in accordance with some embodiments. One example use would be for a parent to be able to monitor from their smartphone, text messages their child is transmitting on their smartphone to one or more parties.

Figure 12:
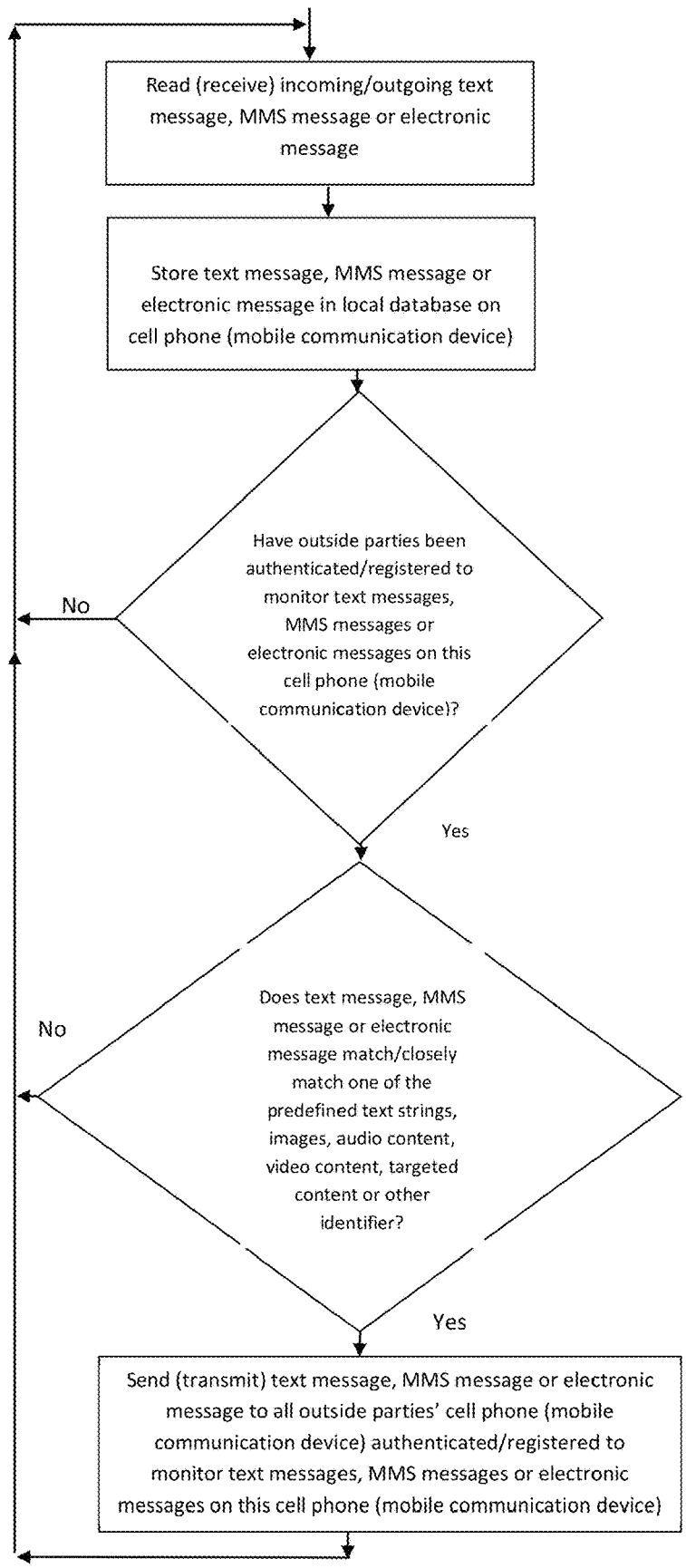
FIG. 12 is a flowchart illustrating an example process for providing copies of incoming SMS, MIMS or any electronic message communications, based on certain conditions being met, from a mobile communication device being monitored to one or more mobile communication devices authenticated or registered to monitor such communications in accordance with some embodiments.

Another embodiment of this technology provides a method for transmitting only the incoming and/or outgoing text messages, SMS, MIMS, images, audio clips, video clips, audio/video clips or electronic messaging from a mobile communication device being monitored to monitoring mobile communication devices that have/include a word, text string, image, image snippet, audio clip, video clip or other identifier that has been predefined or is target content (FIG. 12). FIG. 12 is a flowchart illustrating an example process for providing copies of text messages, SMS, MIMS, images, audio clips, video clips or any electronic message communications, based on certain conditions being met, from a mobile communication device being monitored to one or more mobile communication devices optionally authenticated to monitor such communications in accordance with some embodiments. One example use of this embodiment is to enable a parent to received copies of text messages, SMS, MIMS, images, audio, video or other electronic messages that match or have a close proximity match to targeted words, text strings, acronyms, short hand, codes, images, image snippets, audio, video or other identifiers. This allows a parent to judiciously monitor their children's electronic messaging content only when there are reasonable grounds or probably cause.

Figure 13:
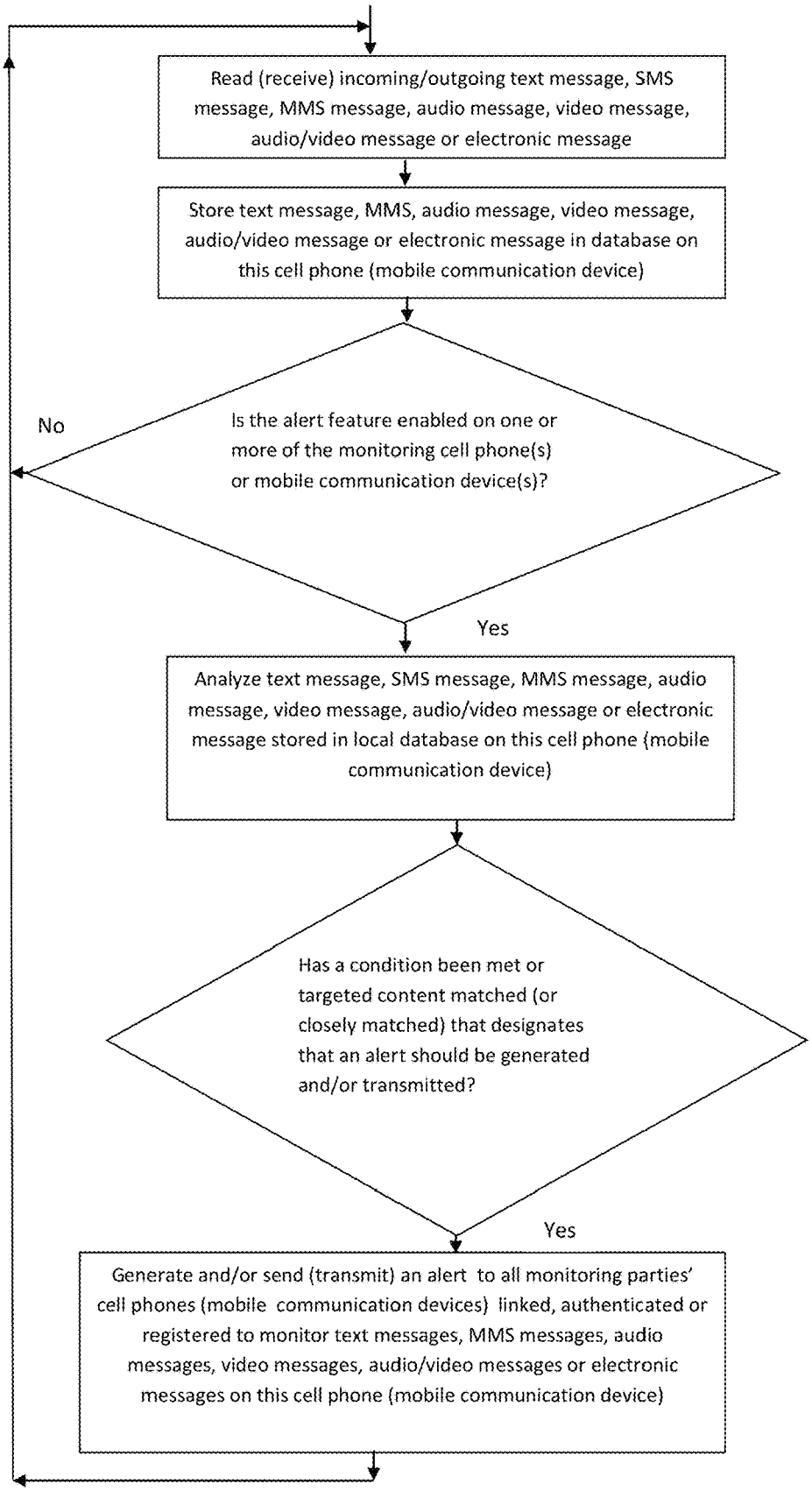
FIG. 13 is a flowchart illustrating an example process for generating alerts (warnings) for one or more mobile communication devices authenticated or registered to monitor communications on the mobile communication device being monitored when certain conditions have been met or target content has been matched to, based on predefined data/content stored in a data structure or database (Target Element Data) on either the monitoring or monitored mobile communication device in accordance with some embodiments.

Alerts can optionally be generated and displayed on the Monitoring Party's mobile communication device (cell phone) indicating that a match or close proximity match was detected based on the comparison of the communication content to the predefined words, text strings, acronyms, short hand, codes, images, image snippets, audio, video, audio/video or other identifiers (FIG. 13). FIG. 13 is a flowchart illustrating an example process for transmitting alerts (warnings) to one or more mobile communication devices optionally authenticated to monitor communications on the mobile communication device being monitored when certain conditions have been met based on predefined data stored (Stored Elements) or targeted content has been matched or reasonably matched (close proximity match) in a local data structure or database on the mobile communication device being monitored or the monitoring mobile communication device, which is in accordance with some embodiments.

Figure 14:
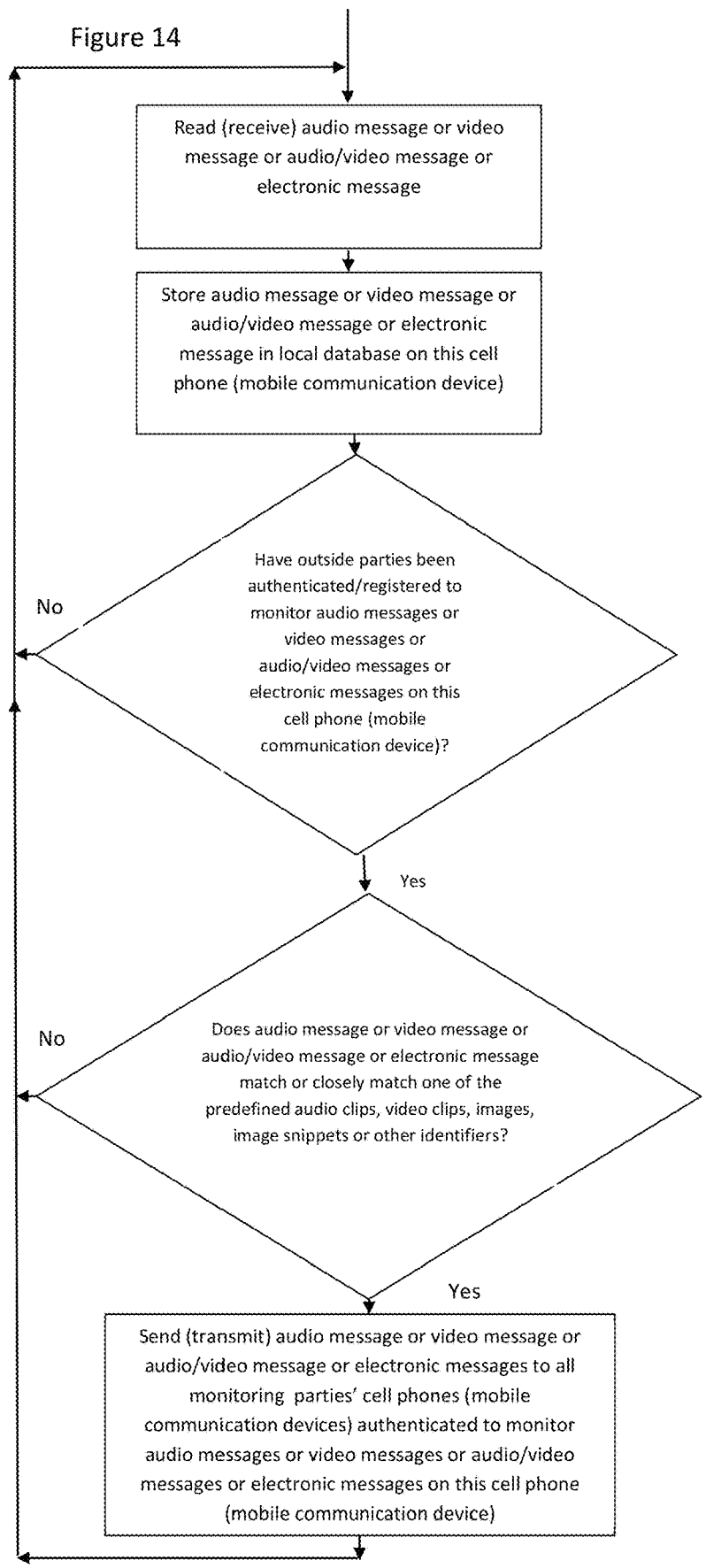
FIG. 14 is a flowchart illustrating an example process for providing copies of incoming audio communications, video communications or audio/video communications based on certain conditions being met, target content being matched to or target content having a close proximity match to predefined data/content stored in a data structure or database from a mobile communication device being monitored to one or more mobile communication devices authenticated to monitor such communications in accordance with some embodiments.

Another embodiment of this technology provides a method for transmitting incoming and/or outgoing voice/audio content or clips that match or reasonably match (close proximity match) a predefined audio content/clip (targeted content) stored in a library or database (FIG. 14). FIG. 14 is a flowchart illustrating an example process for providing copies of incoming audio communications (message) or video communications (message), based on certain conditions being met, from a mobile communication device being monitored to one or more mobile communication devices optionally authenticated to monitor such communications in accordance with some embodiments.

One example use of this embodiment is to enable a parent to monitor voice/audio calls for selected words, sounds or other audio identifiers. This allows a parent to monitor their children's phone (audio) conversations by receiving specific audio clips, words, sounds, or other audio identifiers that match those that were predefined, when they occur on their children's cell phone(s) or mobile communication device. Alerts can also be sent to the monitoring party's cell phone or mobile communication device indicating that a match or close proximity match has occurred.

Figure 15:
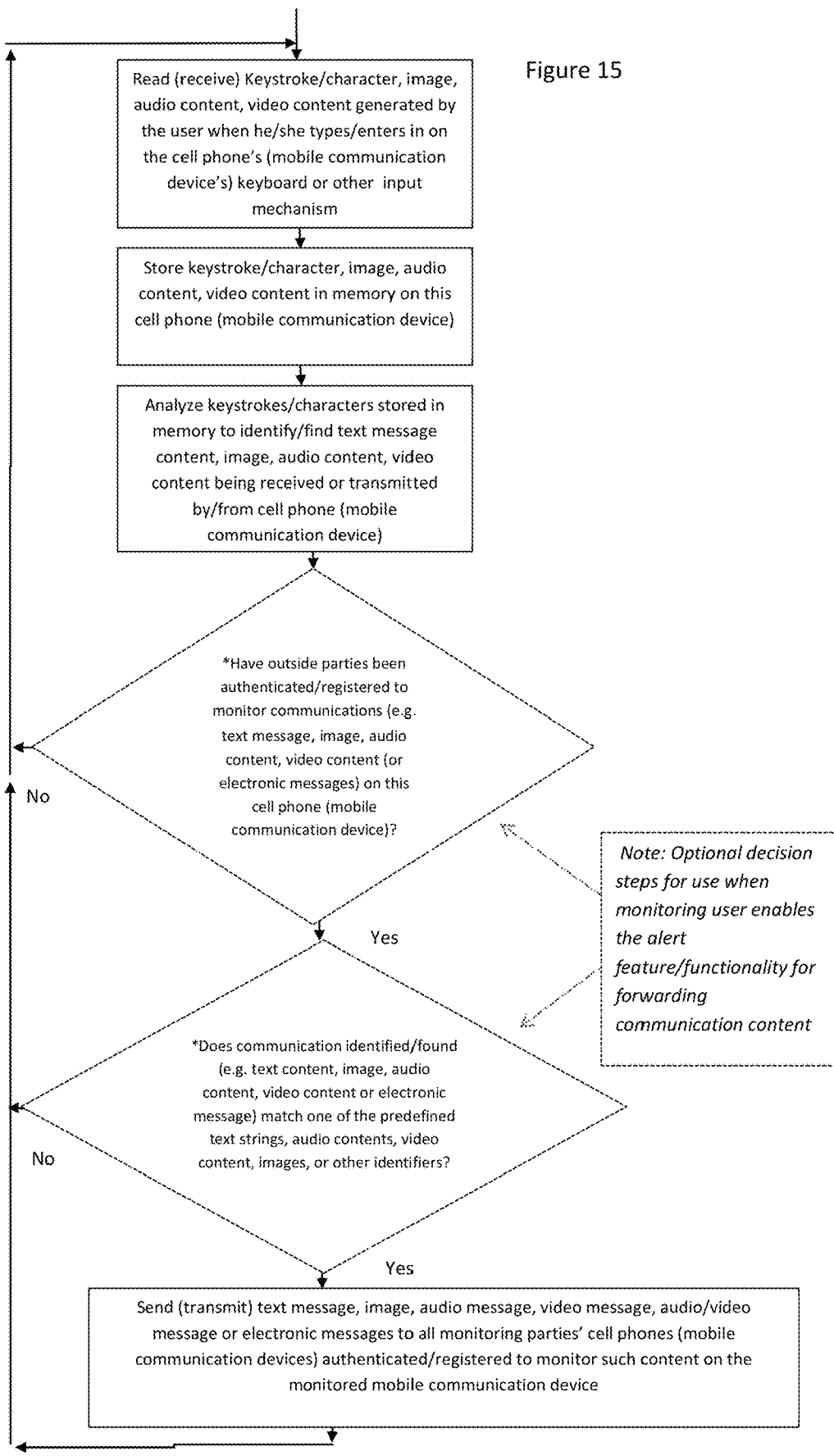
FIG. 15 is a flowchart illustrating an example process for providing copies of all keystrokes or characters entered in or images created (i.e. pictures from camera feature on mobile device) on a mobile communication device being monitored by one or more mobile communication devices authenticated or registered to monitor such keystrokes and images in accordance with some embodiments.

FIG. 15 is a flowchart illustrating an example process for providing copies of all keystrokes or characters entered in (e.g., text message), images, audio, video, audio/video or multimedia message created (e.g. pictures from camera feature on mobile a device) on a mobile communication device being monitored by one or more mobile communication devices optionally authenticated to monitor such keystrokes, characters, images, audio content, video content, audio/video content or multimedia messages in accordance with some embodiments.

Figure 16:
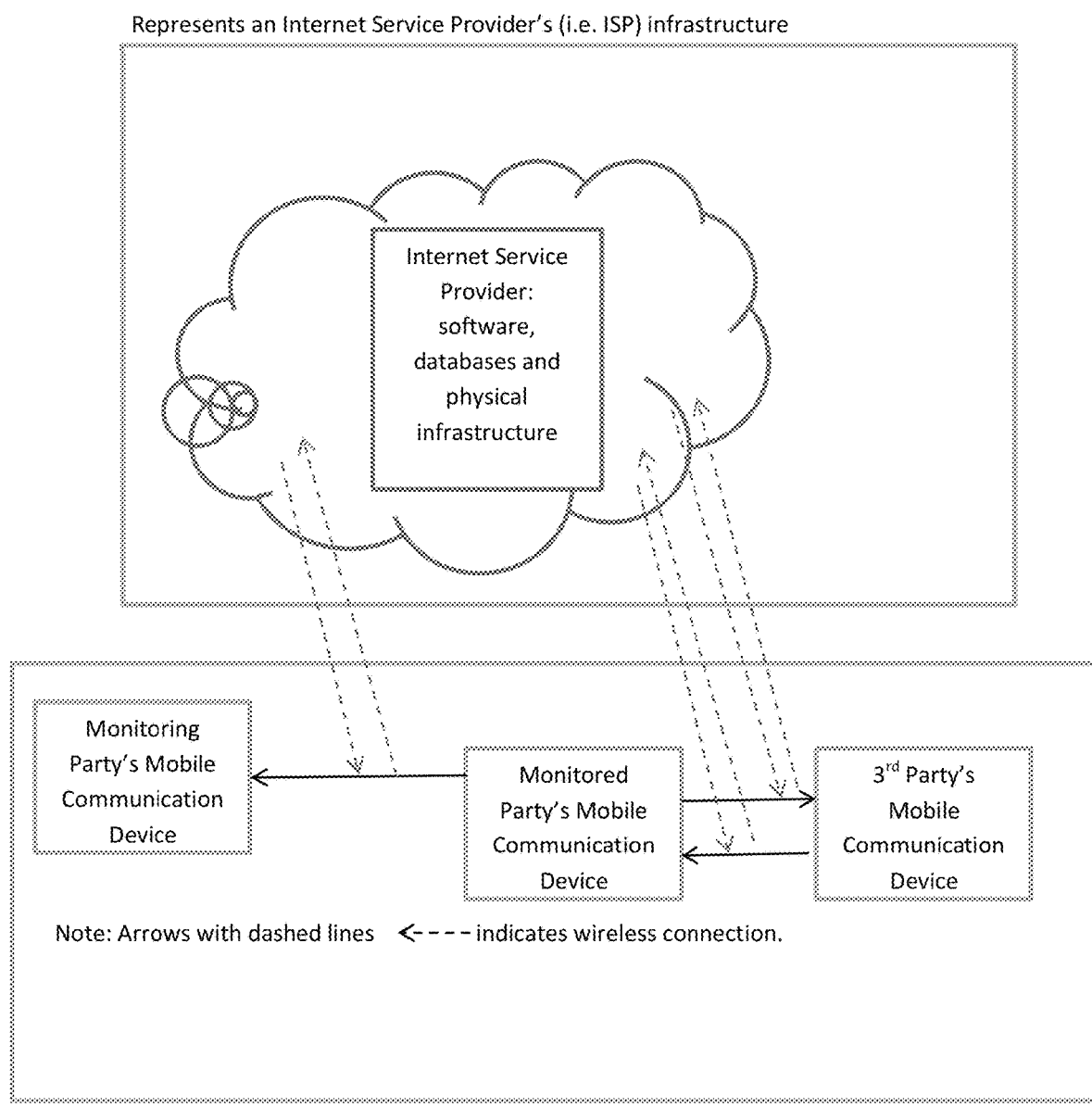
FIG. 16 is a schematic diagram of an embodiment for facilitating wireless communication among communication devices, in accordance with some embodiments, including communications through the Internet via a Wi-Fi, Bluetooth or other wireless technology connection.

FIG. 16 is a schematic diagram of an embodiment for facilitating wireless communication among communication devices, in accordance with some embodiments. In particular with this example, communications can be through the Internet via a Wi-Fi, Bluetooth or other wireless technology connection.

Figure 17:
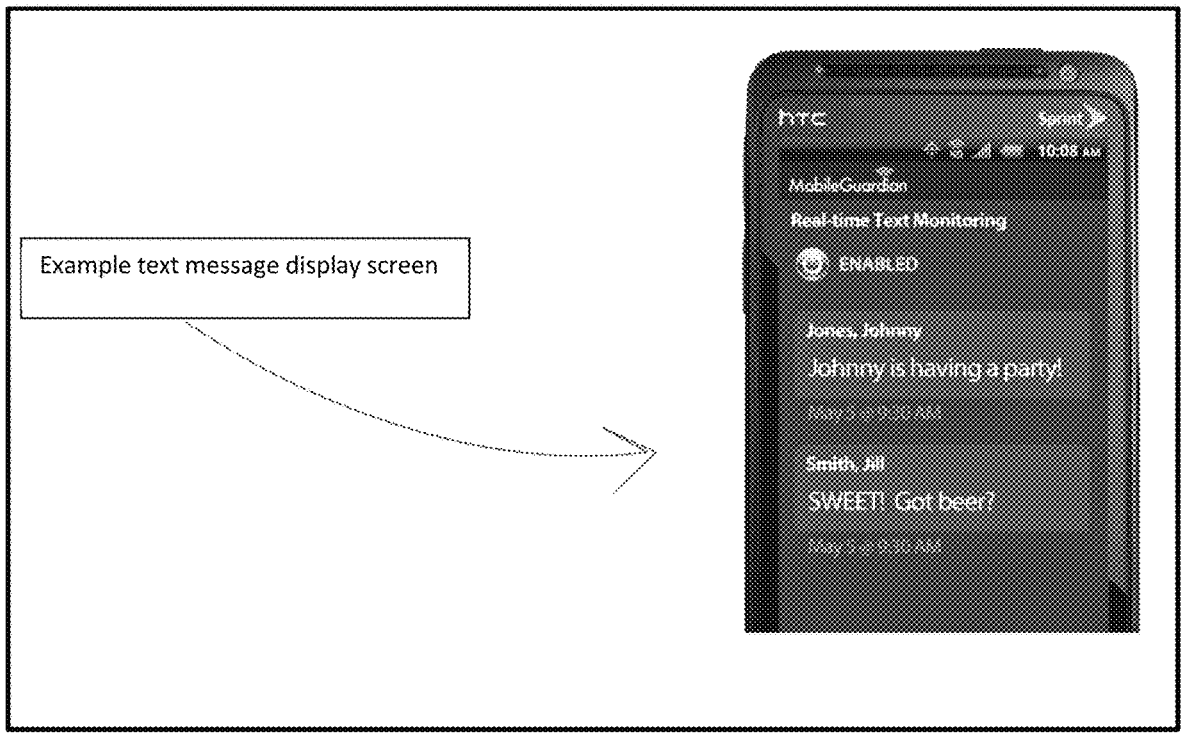
FIG. 17 is an example of a user interface that may be incorporated on the monitoring cell phone, smartphone or mobile communication device to enable the monitoring user to view, in the case of firmware, text messages or SMS that have occurred on the monitored user's cell phone, smartphone or mobile communication device, and are about to occur (past and present).

FIG. 17 is an example of a user interface that may be incorporated on the monitoring cell phone, smartphone or other mobile communication device to enable the monitoring user to view, in the case of firmware, text messages or SMS that have occurred on the monitored user's cell phone, smartphone or mobile communication device, and are about to occur (past and present). That is, if a monitoring user opened this user interface on their mobile communication device on a specific day, a copy or log of all text messages, for example, from the previous day's communication on the monitored user mobile communication device would be accessible by scrolling backwards on the interface. Additionally and following this logic, other past day's text messages or SMS (2 days previous, 3 days previous and so on) would be accessible by the monitoring user on this user interface. In another instance of this example, if a new text message or SMS is generated by the monitored user while the monitoring user is on/viewing this example user interface, then the new text message or SMS would be displayed in near real-time on the user interface (in chronological order with the other text messages or SMS). Therefore, the user would see the text message or SMS appear on the user interface in near real-time as it was generated on the monitored user's cell phone, smartphone or mobile communication device.

A text message or SMS displayed on this example user interface could optionally include all information that a typical text message or SMS would make available to software or a mobile application (mobile app) such as time and date stamp of when it was received or transmitted on/from the monitored user interface, the phone number or user identification number of the monitored user's or one or more 3 rd party cell phones, smartphones or mobile communication devices involved in the communication and any other information pertinent or available from the message, from the messaging service providing the text message or SMS or information related to the message. Additionally, this example user interface would allow a pre-determined total number of text messages or SMS to be stored for display (viewing may be implemented by enabling scrolling backwards and forward on the user interface) and in this example, the software would either rewrite over the oldest message when the storage limit was achieved by implementing a circular buffer technique or would generate a warning message to the monitoring user's cell phone, smartphone or mobile communication device indicating that the text message or SMS log was full and that it should be cleared or individual messages of the choice of the user should be deleted to make room for new, incoming text messages or SMS.

Figure 18:
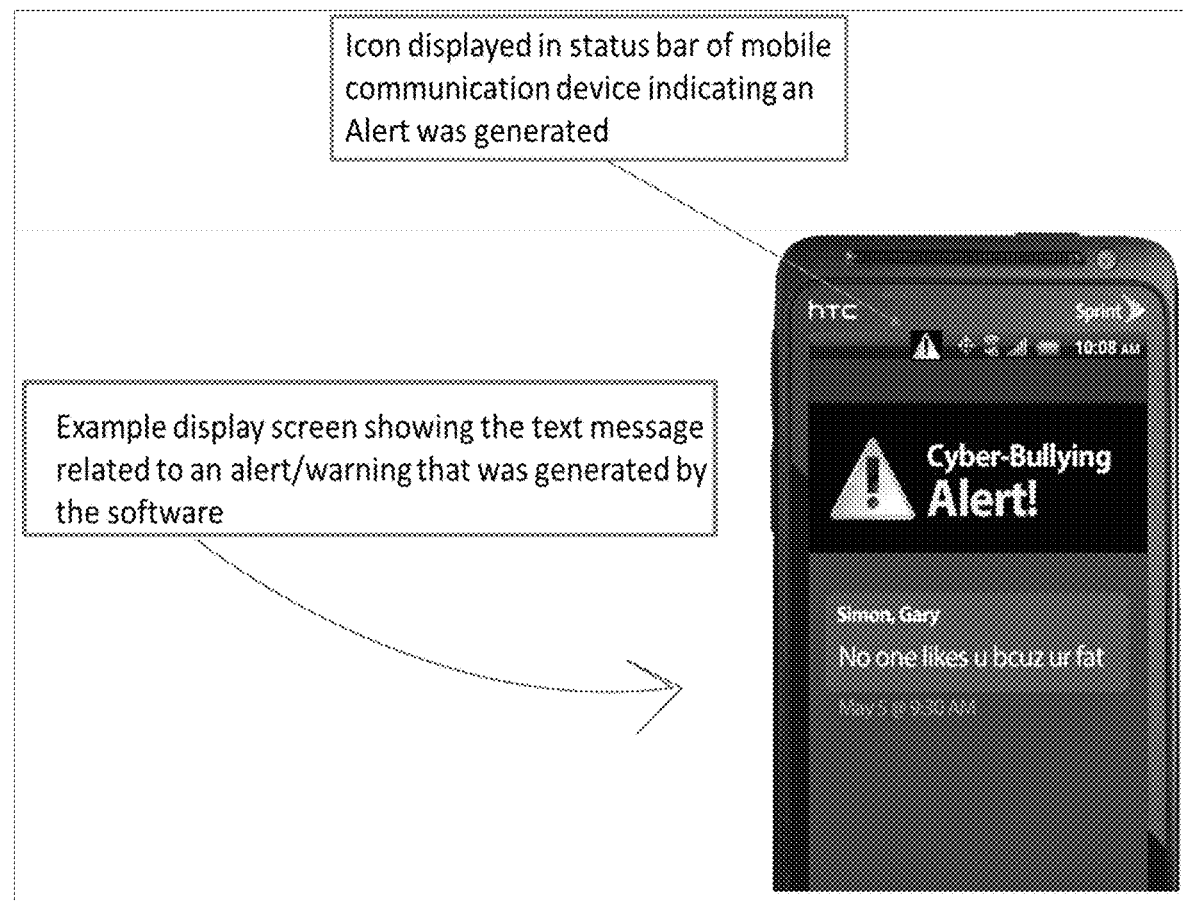
FIG. 18 is an example of a user interface that may be incorporated on the monitoring cell phone, smartphone or mobile communication device for displaying a text message or SMS that is associated with an alert (or warning) that was generated by the software because it detected targeted content (e.g. possible inappropriate content) that occurred on the monitored user's cell phone, smartphone or mobile communication device.

FIG. 18 is an example of a user interface that may be incorporated on the monitoring cell phone, smartphone or mobile communication device for displaying a text message or SMS that is associated with an alert (or warning) that was generated by the software because it detected targeted content (e.g. possible inappropriate content) that occurred on the monitored user's cell phone, smartphone or mobile communication device. In this example, the alert causes at least 2 actions to occur on the monitoring user's cell phone, smartphone or mobile communication device. 1) It enables the monitoring user to open up or invoke a user interface, like the example user interface (FIG. 18), that will display the text message or SMS that the software matched or determined was a close proximity match to target content stored in a local database on either the monitored user's cell phone, smartphone or other mobile communication device or on the monitoring user's cell phone, smartphone or other mobile communication device; 2) The software will display an alert that would attempt to capture the attention of the monitoring user to make he/she aware that a warning (alert) has occurred. This alert could be displayed, for example, as an icon on the status bar of the primary user interface of a cell phone, smartphone or other mobile communication device (FIG. 18) or it could be in the form of a text message, pop up message, audio message, image message, instant message or other type of message that would attempt to gain the attention of the monitoring user when they looked at the display of or used their cell phone, smartphone or other mobile communication device.

Figure 19:
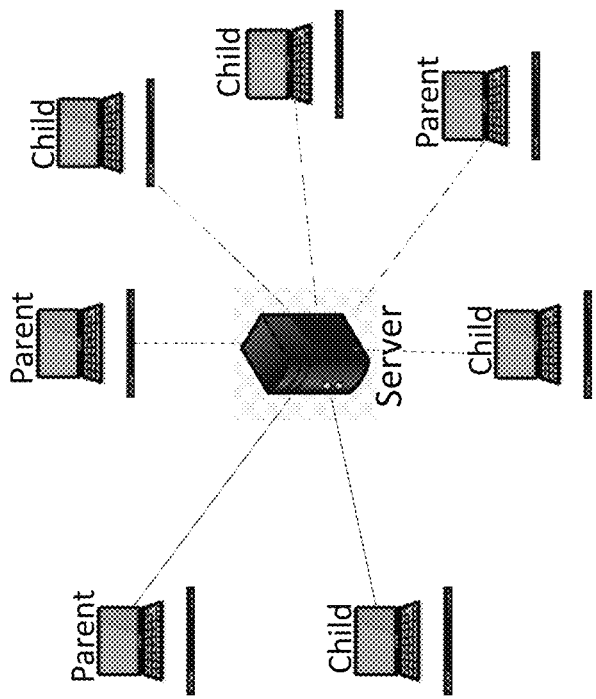
FIG. 19 is an example of a hybrid peer-to-peer network architecture for use in example methods.
Figure 20:
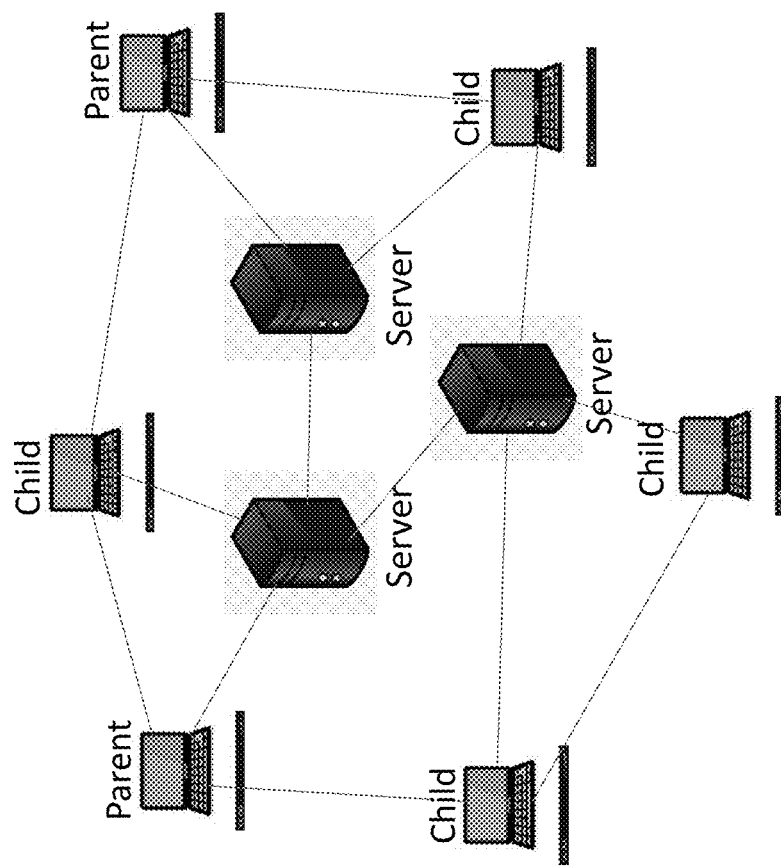
FIG. 20 is another example of a hybrid peer-to-peer network architecture for use in example methods.

FIGS. 19-20 illustrate features of peer-to-peer network architectures that can provide a network architecture for example monitoring methods disclosed herein. Generally, hybrid peer-to-peer networks can combine either some or all the functionality of both peer-to-peer and client/server network architectures. In FIGS. 19-20, monitored and monitoring mobile communication devices, shown as Child and Parent devices, as a nonlimiting example, provide two or more nodes. In FIG. 19, the server acts as a communication bridge between nodes communicating in a peer-to-peer fashion. The server provides the authentication between child and parent nodes and facilitates a communication channel between them in an example type of hybrid peer-to-peer network. In this example, the server does not act as a centralized server that provides most of the resources (e.g. storing and archiving data, software, etc.) but acts as a server to help peers find one another and facilitate communications between them. FIG. 19 denotes an authenticated communication channel between parent and child nodes with the type of connecting line used (solid, dashed, dot-dashed). FIG. 20 illustrates another example peer-to-peer network structure whereby every node (though not required in all such structures) can communicate with each other directly without the need of a server.

In an example hybrid-peer-to-peer network architecture, a link establishing communication channels for authenticated connections is provided via a server (or one or more connected servers), e.g., an index server, or via the Cloud, e.g., an index server or other server in the Cloud. The link manages the connections to facilitate unidirectional or bidirectional data transfers between the monitored and monitoring communication devices (nodes). In FIGS. 19-20 matching lines (e.g., solid, dashed, dashed dot) depict authenticated communication channels that are facilitated by the server or Cloud link.

In some example hybrid peer-to-peer architecture embodiments, a server (e.g., centralized server) or Cloud server helps peers find each other to provide monitoring and/or forwarding applications. Other example embodiments provide a hybrid peer-to-peer network that combines a peer-to-peer network model with a web-service to communicate to another peer for monitoring and/or forwarding. Still other example embodiments incorporate a hybrid peer-to-peer network that combines a peer-to-peer network model with a program (i.e., software) to communicate to another peer for monitoring or and/or forwarding through a computer or server (e.g., chat server, relay server, Internet Relay Chat (IRC), etc.).

Hybrid peer-to-peer network architectures (schemes) generally may be implemented to enable the communication between the monitored mobile communication device and the monitoring mobile communication device, as shown by example in FIG. 20. In the example architecture shown in FIG. 20, the various lines indicate a link and communication channel between two (or more) nodes which was coordinated by the server(s).

In an example operational method, upon an established link between monitored and monitoring communication device(s), a "room" can be established on the server to facilitate a communication channel between them. A "room," for instance, may be implemented by a suitable programming tool such as a web application programming tool, a particular nonlimiting example of which being Sock-t.IO, a commercially available programming tool that can be used for example methods. Socket.IO is a JavaScript library for real-time web applications. It enables real time, unidirectional or bi-directional communication between web clients and servers.

In some example methods, the monitored device and the monitoring device communicate with each other directly using the server to facilitate such communication. Depending on the programming tool utilized for enabling the communication, the term "room" may be used to describe it.

In some example methods, the monitored device sends one or more alerts and associated electronic messages (e.g., text messages, images, videos, audio, etc.) to the "room," and a flag is raised (or other indicator or notification is provided) to signal to the monitoring communication device that there are alerts and electronic messages for it to download. Once the download is completed, the flag can be lowered (or other indicator can be removed) to indicate that there are no more alerts and electronic messages in the "room". In example embodiments, data associated with a "room" (transmitted/received through a "room") can be temporary; that is, not intended for long term storage or archiving.

An example hybrid peer-to-peer network scheme can be used as a mechanism to create a channel between two or more nodes (e.g., mobile communication devices), where only those nodes (e.g., grouped together from a pre-established link, have the credentials (or are otherwise authorized) to access the "room". It can also be used to keep track of a group of connected users. In some example embodiments, the "room" can be joined or left at any time by the monitored and monitoring mobile communication devices (nodes). No flag is necessary to indicate that status of data in this example embodiment.

Some example methods employing a hybrid peer-to-peer network implementation can incorporate a server (e.g., index server) to facilitate electronic communications from the monitored mobile communication device to the monitoring mobile communication device without permanently storing the electronic communication on the server. More specifically, files can be shared between nodes (e.g. child/parent mobile communication devices) as opposed to sharing through the means of a centralized server. In such embodiments a connection between two or more peers (e.g., socket, channel, session) can be established and data communications can flow in a unidirectional fashion (one-way) from one peer to another (i.e., data flows only from sender to receiver or receivers) or bi-directionally (i.e., where each peer can transmit and receive data communications (e.g., FIG. 20).

Such example architectures can be configured such that electronic communications (e.g. data) are stored for a significant duration only on the monitored mobile communication device and/or the monitoring mobile communication device, and merely flow through the server facilitating the connection and communications. However, it will be appreciated that the server may temporarily store the electronic communication (e.g. data) as it flows from the monitored mobile communication device to the monitoring mobile communication device.

Another example application of a hybrid peer-to-peer network implementation can be similar to the implementation disclosed above, except with the server replaced by a web service. By way of background, the term "web service" typically refers to a service offered by an electronic device to another electronic device to enable communications via the Internet or more specifically the World Wide Web. Other web techniques, such as but not limited to Comet, can also be used to facilitate or enable communication between nodes in a peer-to-peer or hybrid peer-to-peer network architecture over the World Wide Web.

In some example implementations of hybrid peer to peer network architectures such as those described above the server may be considered to act as (or analogous to) an "indexing server" containing the information about the location of each of the nodes in the network. The server can also act as a link between nodes to create a communication channel between two or more nodes, as shown in FIG. 20.

Some example methods for implementing a hybrid peer-to-peer network environment employ asynchronous service to service communication used in serverless and microservices architectures. One example technique or technology that can be used that incorporates this type of approach is sometimes referred to as "Publish/Subscribe Messaging" or Pub/Sub Messaging for short. With this example approach, the Publishers and Subscribers are a group of connections that can connect to each through some mechanism. The concept of a "room" as disclosed above is one such technique. In example methods, the Publishers and Subscribers are analogous to monitoring communication devices (e.g. parent/parents) and monitored communication devices (e.g. child/children).

Example methods for capturing electronic messages (e.g. text messages, images, videos, audio, electronic messages, etc.) on a mobile communication device being monitored will now be descried. One example method for capturing electronic messages is to read the input/output buffers that reside on the mobile communication device where data is received from or transmitted to another mobile communication device, computer, server, the Cloud, etc. These buffers are usually reserved for this purpose and in some cases can be built into the hardware or firmware of the device.

Another example method is to read the memory locations where apps or applications store the input/output data being received from or transmitted to another mobile communication device.

Another example method is to read the screen, perform a screen capture or capture/record a video stream occurring on the screen or other output interface of a mobile communication device being monitored. This requires capturing (reading) the screen periodically or at particular time intervals. In order to more diligently scan for targeted content, the screen capture or video stream capture operation can occur frequently in order to ensure the vast majority of the content being displayed on the screen, either inbound, outbound or previously stored is read and then subsequently compared against targeted or trained targeted content. One example approach is to attempt to capture/read the device screen (display) at least once per second. This will almost ensure that no content that would qualify as targeted content will be missed. The reason is that, for example, an average person usually takes at least one second to view an image, text message, etc. once it is displayed on the screen.

In some example embodiments, the monitoring of mobile communication devices for targeted content (e.g. images, MIMS, SMS, text messages, videos, audio files, electronic messages, etc.) can include analyzing communications for determining a match or a comparable match to such targeted content. Such analysis can employ, for instance, algorithms and data structures/databases for determining the match or comparable match.

Some example methods can use artificial intelligence methods to perform this analysis. Generally, processor-based algorithms and techniques such as machine learning (ML), neural networks, deep learning networks, convolutional neural networks (CNN), computer vision, machine vision, etc. are considered subsets of Artificial Intelligence. As used herein, Artificial Intelligence (AI) generally refers to the simulation of human intelligence processes by machines (i.e., processor-based hardware implementing one or more software/firmware-based algorithms). Example machines include processor-based systems (e.g., computer systems) including but not limited to mobile communication devices. Specific applications of AI include but are not limited to expert systems, natural language processing (NLP), speech recognition and machine vision.

More recent AI methods such as machine learning can predict or make decisions based on sample data sometimes known as training data, which in many cases creates a particular model that is used for this purpose. In some cases, certain models can increase in effectiveness or "learn" as they execute on future instances of data (e.g. images) provided (input) to it. One nonlimiting example machine learning architecture that has been shown to be especially useful for image analysis (but can be used for other analysis as well) is a Convolutional Neural Network (CNN).

In some example embodiments, one or more AI techniques, such as machine learning, neural networks, deep learning networks, convolutional neural networks, computer vision, etc., can employ algorithms, data structures, trained models from data sets, etc. to determine or help determine what would be targeted or potentially targeted content for determining a direct match or comparable match of an electronic message (i.e., image, video, audio file, text message, text message embedded into an image or video, etc.). To obtain an exact match across two images, for instance, is highly unlikely due to the nature of the data that comprises an image or video frame (i.e., every pixel in the image would need to match). However, the ability to compare different images to targeted content that is of the same theme (i.e., akin to) but are not exact matches has value in applications including example analysis methods herein.

As an example of possible targeted content, a selfie of a shirtless man may need to be compared to images of other shirtless men trained into an AI model. The shirtless men in the trained AI model are not exact matches to the image being compared against the AI model and therefore, the AI algorithm (AI model) can determine if there is a "comparable match" (i.e, would be akin to). Machine Learning, neural networks, deep learning networks, CNNs, etc. are nonlimiting examples of AI technologies that may be used in computing devices, including but not limited to mobile software apps, to provide enhanced clarification for determining a "comparable match".

Some example AI algorithms and models for comparing different types of content (e.g., image content, video content, audio content, text content) can optionally implement a rating or scoring method for identifying similarities to targeted content. For example, an AI algorithm (such as but not limited to a CNN) can return a rating level of an image whereby the rating scale is 0.001 to 0.100 and a rating over 0.050 is considered a threshold for a strong enough match or comparable match. If the threshold is met, the computing device (e.g., the monitored user's mobile communication device, or child device can then generate an alert to be sent to the monitoring mobile communication device (e.g., parent device).

Some example embodiments provide an AI algorithm with a trained model (e.g., trained with targeted content) for determining if the content received, sent or displayed on the screen (e.g., screen capture, video stream capture) on a monitored user's mobile communication device is a match or comparable match to targeted content or trained targeted content. In some example embodiments, this AI algorithm with a trained model can reside (fully or partially) on the monitored user's mobile communication device whereby it is implemented as a mobile app or part (integrated into) a mobile app, is provided as an operating system service, is provided as a hardware/firmware system service, is a callable library function, an application component or any other software manifestation on a mobile communication device known in the art. Some example embodiments use a CNN algorithm and trained model to analyze for and determine if there is a match or comparable match to content received, sent or displayed on the screen (e.g. screen capture, video stream capture) on the monitored user's mobile communication device.

Figure 21:
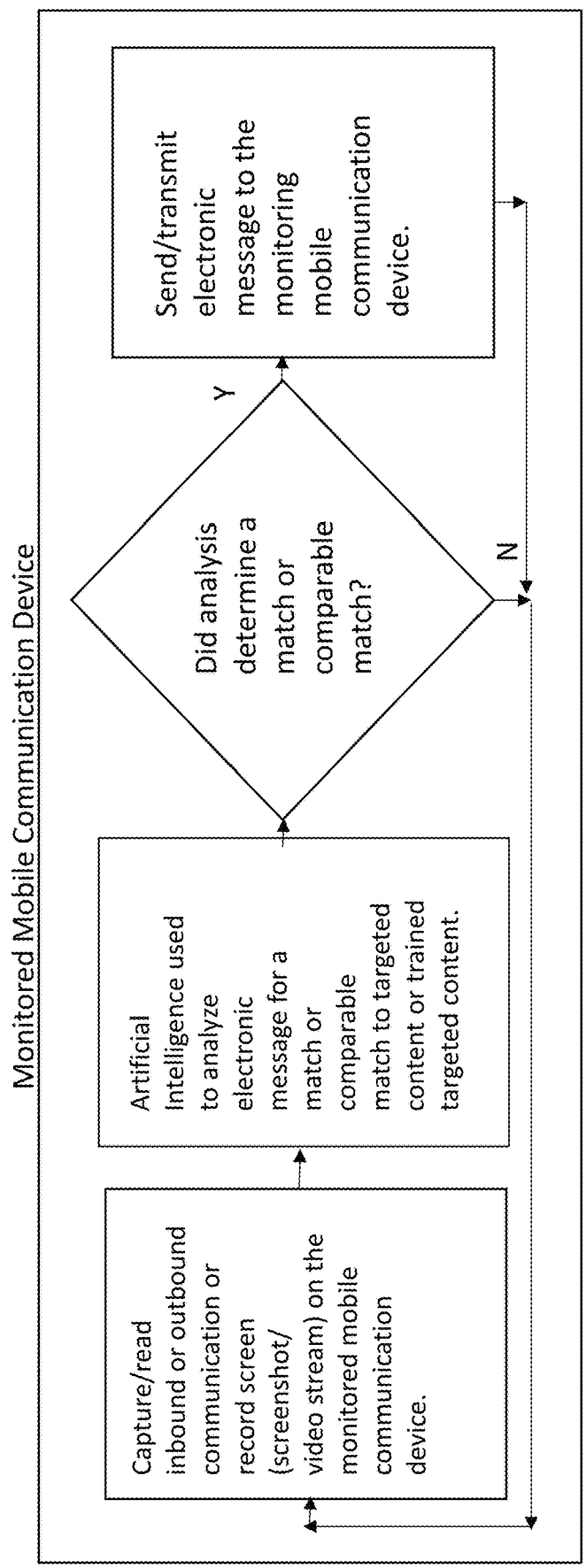
FIG. 21 shows an example process performed by the monitored user's mobile communication device for analyzing incoming or outgoing communications on the monitored user's communication device, using an AI model trained with targeted content.

For example, FIG. 21 shows an example process that can be performed by the monitored user's mobile communication device (for instance) for determining whether incoming or outgoing communications on the monitored user's communication device matches or closely matches (i.e., is a comparable match to) targeted content, using an AI model trained with targeted content. The monitored user's communication device captures, e.g., reads, incoming or outgoing communications and/or performs a screen capture (captures what is currently on the screen, or a portion thereof), and then provides (e.g., inputs) the communication to an AI algorithm with a trained model for identifying predetermined targeted content (e.g., a CNN algorithm and trained model).

The AI Algorithm returns a rating (e.g., on a scale of 1-100). If the rating exceeds a predetermined threshold or a user selected threshold (e.g., 50), then a match or comparable match is determined, and the communication (or portions of communications that are determined to be a comparable match) is sent/transmitted to the monitoring user's communication device. Further, and as explained in more detail below, the communication (e.g. image, video) may be obfuscated (e.g., blurred) depending on the specific application.

CNNs are a useful type of AI technology that can be employed to identify comparable matches within a class or category of images (e.g. detecting nudity in an image). Due to the nature of identifying this type of targeted content within an image or video for monitoring purposes, utilizing an algorithm to find an exact match between two images would typically not be practical. For instance, finding an exact match of corresponding pixels across two images would typically have little value in an image monitoring application, since it is highly unlikely that an image generated by a monitored device will have a direct match to an image or images being used as targeted content. Similarly, the same is true for a video and audio as it relates to a match or comparable match.

However, it can be useful to determine both exact matches and comparable matches for text message monitoring or monitoring of text messages that are part of (incorporated into) an image. Text messages (i.e., words, acronyms) inherently lend themselves to exact matches. For example, two sets of letters that make up the same word that are in two different fonts, have the same meaning.

In some example embodiments the AI algorithm with a trained model (trained with targeted content) on the monitored user's mobile communication device is incorporated (integrated) into a mobile app which transmits and receives data in a peer-to-peer architecture. In other example embodiments, the AI algorithm with a trained model (trained with targeted content) on the monitored user's mobile communication device is incorporated (integrated) into a mobile app which transmits and receives data in a hybrid peer-to-peer architecture.

For instance, an implementation of a specific algorithm and data structure/database that employs a CNN, deep learning, or other AI method can reside on the monitored user's mobile communication device, and can be incorporated (integrated) into a mobile app which transmits and receives data from the monitored user's mobile communication device to and from the monitoring user's mobile communication device in a hybrid peer-to-peer architecture. Some example implementations need not transfer the data (e.g., image, video frame, electronic communication) to a server (e.g., in the hybrid peer-to-peer architecture) to perform the "comparable match" analysis by the AI model, but instead may utilize a server (e.g. index server, chat server, Internet Relay Server, etc.) merely for the purpose of facilitating peer-to-peer communication between the monitored mobile communication device and the monitoring mobile communication device (in the hybrid peer-to-peer network architecture). This can be implemented as unidirectional or bidirectional communication between the monitored mobile communication device and the monitoring mobile communication device.

In other example embodiments, the example AI algorithm with a trained model (trained with targeted content) can reside in the Cloud or server. In such embodiments, the monitored user's mobile communication device can transfer the incoming or outgoing communications or what is displayed on the monitored user's mobile device screen (e.g., screen capture, video stream capture) to the Cloud or server, where an AI algorithm and trained model can be executed to determine if there is a match or comparable match to the trained targeted content.

As provided herein, "Cloud" or "the Cloud" refers to the computer science definition of the same for which one explanation is on-demand availability of computer system resources, especially data storage and computing power, without direct active management by the user. Cloud computing typically shares computer resources to achieve uniformity among shared resource and economies of scale (e.g. scale-up). Examples of service providers of Cloud services today include but are not limited to Google Cloud Platform, AWS (Amazon Web Services), Microsoft Azure and IBM Cloud. Examples of specific types of Cloud computing models commercially available today are IaaS (Infrastructure as a Service), Platform as a Service (Paas) and Software as a Service (SaaS). All embodiments of this invention may also be implemented in a Hybrid Cloud architecture (scheme) which is essentially a way to connect infrastructure and applications between cloud-based resources and existing resources that are not located in the Cloud in addition to optionally connecting to other types of Cloud resources (e.g. Multi-Cloud).

In other example embodiments, the implementation of the analysis (e.g. as performed using CNNs, deep learning, or other AI methods) to determine a direct or comparable match can be processed in the Cloud (i.e. virtual servers). This example implementation can include transferring data to the cloud to perform the "comparable match" processing. Other embodiments can include a similar implementation as Cloud embodiment, except that the data to be processed can be sent to a server (e.g. client/server architecture) to perform the processing to determine a match or comparable match.

In still other example embodiments, a user or other party can select a level of sensitivity for which images, videos, audio, text messages or other electronic communications are deemed to be (i.e. flagged as) inappropriate, NSFW (Not Safe For Work), illegal, offensive, etc. As a nonlimiting example, the AI algorithm/model can be used to analyze an image for inappropriateness (e.g. nudity) and returns a rating of the image as a value between 1 and 100 whereby 100 is the most inappropriate content (e.g., pornographic images). If the "factory default rating" or threshold that needs to be exceeded in order to generate an alert to the monitoring mobile communication device is 50, for instance, this feature can enable the end user (e.g., parent) to modify the default setting to a different level that would not be as sensitive (e.g. 60) or would be more sensitive (e.g., 40). This could be implemented as a sliding scale of sensitivity options or be a preset number of sensitivity levels (e.g., high, medium and low).

In other example embodiments, the inclusion of an age appropriateness monitoring function can be provided, which can be implemented using AI. For example, image recognition, audio recognition, video recognition, text message recognition, video recognition, etc., functionality can be used to decipher the age of the user being monitored (e.g., a child) in order to alert a parent if the child is entering a false age (for themselves) in order to, for instance, qualify with the terms on a website that is screening the age of their users prior to allowing access to their web content. A nonlimiting example is that this functionality used in conjunction with or independently for websites that requires an end user to enter in their birthdate as a mechanism to comply with the Child Online Privacy Protection Act (COPPA) law.

In other example embodiments, the implementation of either a specific algorithm, a data set (e.g. training data for Artificial Intelligence models/algorithms) or both can reside in a Blockchain technology implementation (Blockchain architecture) on the Internet, as explained in more detail below.

Figure 22:
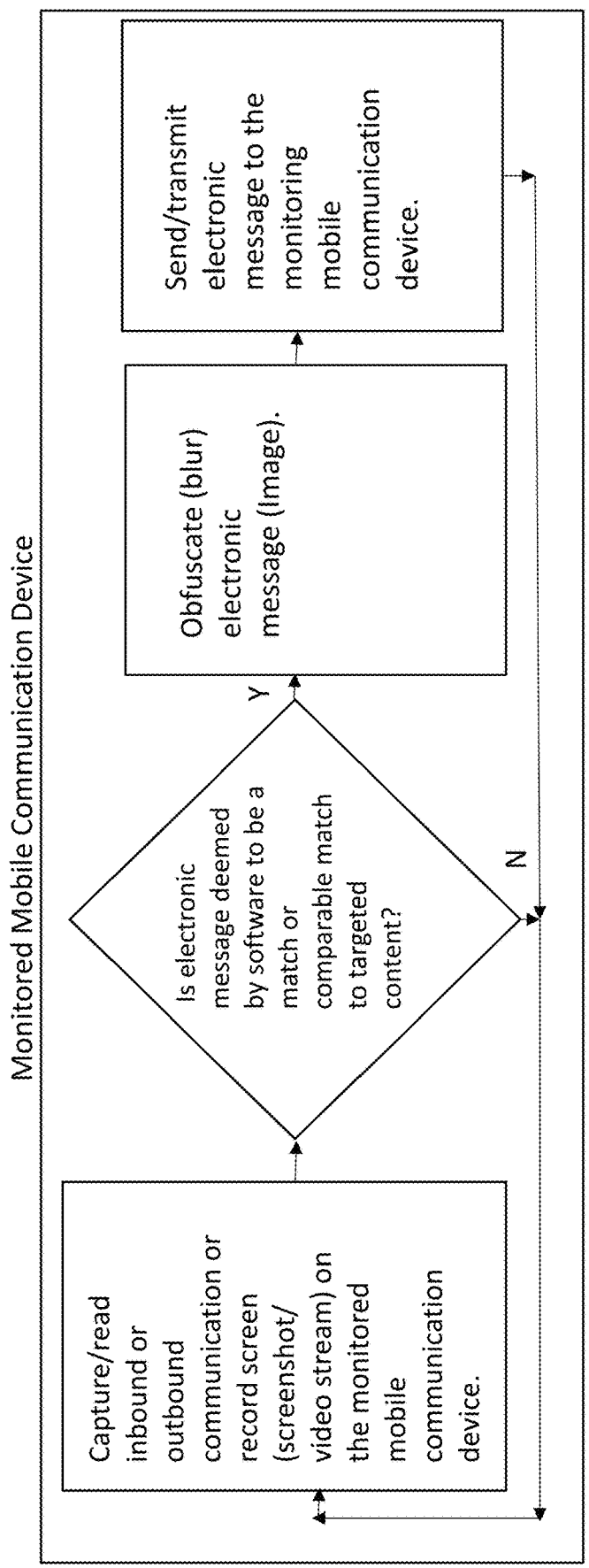
FIG. 22 shows an example process for providing copies of obfuscated (e.g., blurred or distorted) image or video communications (e.g., electronic messages) from a mobile communication device being monitored to one or more mobile communication devices.

FIG. 22 is a flowchart illustrating an example process for providing copies of obfuscated (e.g., blurred or distorted) image or video communications (e.g., electronic messages) from a mobile communication device being monitored (which contains the original non-obfuscated image) to one or more mobile communication devices authenticated or registered to monitor such communications in accordance with some embodiments. The electronic message is captured, e.g., read, and/or the screen of the monitored mobile communication device is captured. It is determined whether the communication is a match or a comparable match to targeted content. If so, all or a portion of the communication is obfuscated. The obfuscated communication is then sent/transmitted to the monitoring mobile communication device.

The following are non-limiting examples of techniques that can be applied in example embodiments to images or videos transmitted from the monitored mobile communication device to the monitoring mobile communication device for the purpose of obfuscating or blurring images or videos prior to them being transmitted to the monitoring mobile communication device: Image blurring, image obfuscation, image pixilation (pixelating an image), pixelization, pixel interpolation, texture filtering, image resolution reduction, etc. Obfuscation techniques for an audio message can include, for instance, audibly distorting the audio file so that is less intelligible or unintelligible.

One example application for obfuscating images is to reduce or eliminate the potential of an adult recipient (monitoring user) being transmitted content such as a pornographic image of a minor (i.e., under-aged person) on their mobile communication device (e.g., smartphone, cell phone, tablet computer, etc.) which may be illegal. For instance, if the image being transferred to the monitoring mobile communication device is that of an under-aged person, then having content that resides on (or is stored on) their mobile communication device (e.g. smartphone, cell phone) would be a violation of the law in some countries. The implementation of a method for image blurring or image obfuscation or other image processing techniques prior to the transferring (transmitting) of images, videos, audio or other electronic messages to a monitoring mobile communication device (e.g. smartphone, cell phone) will help safeguard against inadvertently violating (breaking) the law.

One example for image blurring or image obfuscation that may be implemented by example methods is via a technique referred to as Gaussian blur, which applies a Gaussian mathematical function or functions to an image to obfuscate or blur it. Other variations of this technique include Gaussian smoothing, Gaussian filtering, and Gaussian image processing. Other example techniques for blurring or obfuscating an image that may be implemented by this invention may use low pass filtering to accomplish a blurring effect. Further example techniques for blurring or obfuscating an image that may be implemented including using a Convolution Matrix filter which makes use of matrices or masks to accomplish the blurring effect.

Still other example techniques for blurring or obfuscating an image that may be implemented in example methods include reducing or lowering the resolution (quality) of the image. An example of this technique would be compressing a JPEG image at various levels or percentages to create a blurred effect.

The following is a non-limiting list of terms and techniques for image filtering that may be used to implement (apply) a blurring effect or obfuscate an image: Kernels, blur effect, image convolution, image matrix processing, compression, etc. However, this list should not be considered the complete list. It should also be noted that many or all of the same techniques and tools for obfuscating or blurring an image can be used to either enhance image quality or reverse a technique applied to an image for obfuscating or blurring it. An example for the use of this would be where the face portion of a person in an image was obfuscated or blurred to obtain some level of anonymity. In the case of "Sexting" or sending an inappropriate (e.g., nude, inappropriate gesture, etc.) picture to another person, it is possible that the face portion of the image would be the only section of the image that was obfuscated or blurred. It may be useful to reverse the obfuscation or blurring of the face to facilitate determining the identity of the sender in certain situations.

Some example embodiments can provide blurring or obfuscating various portions of an image or video at different filter levels (e.g., levels of blurriness). An example application of this is where the face of a nude person in an image is obfuscated to a greater extent than the body or vice versa. There are situations where it may be necessary to obfuscate or blur the face portion of an image slightly and obfuscate the body portion of the image more than the face portion. In some embodiments, portions of an image can be obfuscated of blurred at different quality levels. For some example monitoring applications, it is feasible that when inappropriate targeted content is identified that contains nudity, the face portion of the image can be obfuscated or blurred to a lesser extent than the body portion of the image or vice versa. In this regard, algorithms and AI software tools may be employed if needed that can somewhat or completely reverse the blurring effect of an image whereby the identity of the subject may be determined or recognizable.

Some example embodiments enable the obfuscation or blurring of an image (or video) in two or more different segments of the image and at two or more different filtering (quality) levels. For example, in the case of the transmission of a nude image (e.g., "Sexting") the face portion of an image of a person may be obfuscated at a higher quality level than that of the nude body. For example, this functionality may be necessary to provide legal protection against child pornography by obfuscating or blurring the body (i.e., "neck down") portion of the image to a low quality level that is not deemed pornography while obfuscating or blurring the face (i.e., "neck up") portion at a higher quality level so that the identity of the person is distinguishable or recognizable to the person receiving the image.

Additionally, in some embodiments an end user may be able, e.g., by interacting with the software (App), to set the level or levels of filtering for the obfuscation or blurriness. For instance, this may include being able to set the filtering levels of various portions of an image independently. As a nonlimiting example, this can enable the obfuscation of the face portion of an image to be set at a different quality level than the quality level of the body with the ability to adjust each quality level independently.

This could also be implemented with three or more independently adjustable quality levels for three or more portions of an image. In general, the setting of levels of quality of obfuscation or blurriness can be implemented at up to nearly an infinite number of levels and can be set for one, two or more sections of an image independently, e.g., by the software (e.g. App), the end user or a combination of both.

Some example embodiments can additionally provide for the detection of adversarial content, adversarial explicit content, adversarial promotional explicit content or malicious content by a mobile communication device, whereby an alert can be generated with an optional copy of the content in question and an optional description of the content. Example methods can apply one or more software techniques (e.g., AI, machine learning, neural networks, deep learning networks, CNNs, Gaussian filtering, Gaussian image processing, etc.) to determine if an image or video was obfuscated (blurred) to a filtering level or by some other means that would enable it to pass (not create an alarm) a Not Safe For Work (NSFW) safety check/scan (or any other content safety check/scan). It should be noted that NSFW is used herein merely as an example application, and it is not intended to be a limit of the types of applications that it can be used/implemented for.

For instance, there are ways of transferring information in a somewhat stealth form for it to not be flagged by automated methods for detecting such content that may or may not be commercially available and used on a wide scale. As one example, an adversary may try to use the adversarial promotional explicit images to evade inappropriate image detectors for promoting illicit products (e.g., sexual products, gamble sites, illicit online pharmacies, etc.). The adversary may obfuscate the image, using various distortion or filtering techniques (such as noise, blur and occlusion) at a distortion (or filtering) level that that such adversarial promotional explicit images can still be correctly recognized by humans. Example methods can be used to detect such content in communications.

Another non-limiting example is detecting content in military, national defense or law enforcement applications, whereby content may be obfuscated in a way that enables text, audio, image or video content to not be detected or easily detected by services, software, human inspection, surveillances or any other means for inspecting for such content that adversaries would utilize for their purpose or cause.

Another non-limiting application example is detecting content produced for attempted evasion by an adversary from online filtering tools such as the Google SafeSearch tool, which attempts to filter out pornographic and other potentially offensive content during a web search. Another non-limiting example of types of content that may be scanned for by example methods is adversarial promotional pornographic images (APPIs).

Figure 23:
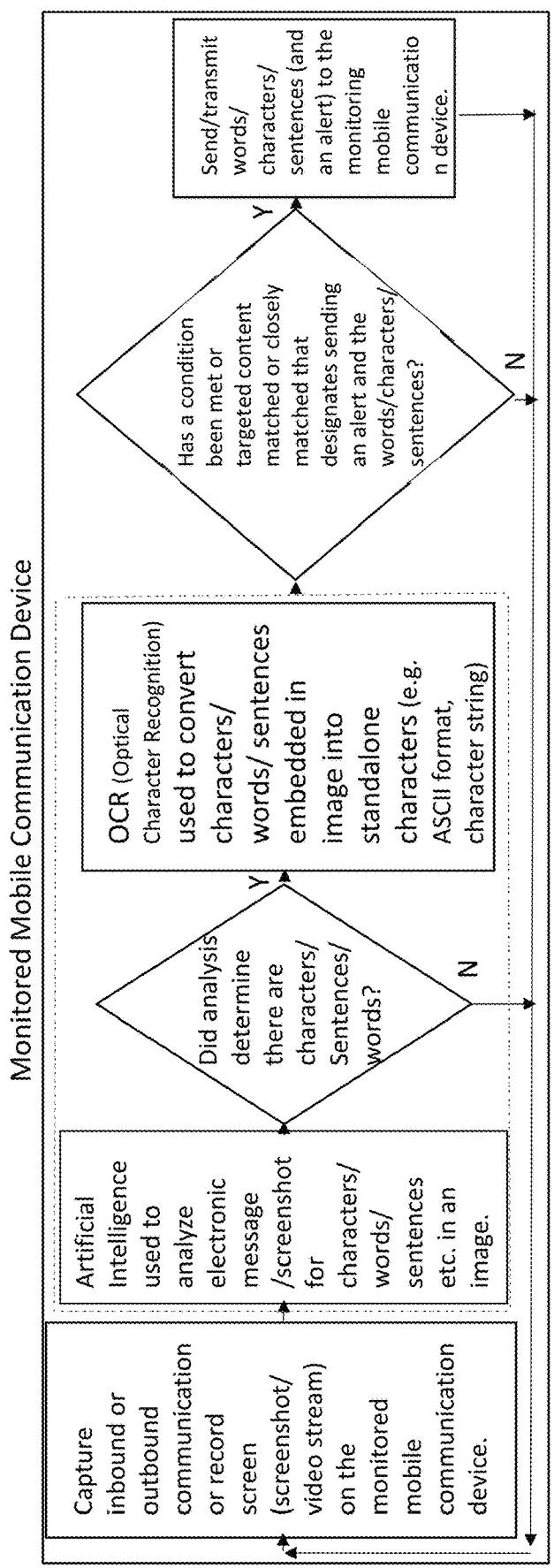
FIG. 23 shows an example process for determining if an image or video that resides on a monitored user's mobile communication device has characters, words or sentences embedded into the image or video.

FIG. 23 is a flowchart illustrating an example process according to additional embodiments for determining if an image or video that resides on a monitored user's mobile communication device has characters, words or sentences embedded into the image or video. An example process uses Artificial Intelligence (AI) algorithms/software/technology. In FIG. 23, dashed lines denote that the functionality grouped together may be provided by a single function, subroutine, library call, web service, etc.

The communication is read or captured, and analyzed using AI, examples of which are provided above. If the AI system determines that the image or video has characters, words or sentences, then Optical Character Recognition algorithms/software/technology (OCR) can be utilized to extract the characters, words or sentences from the image, whereby they can be stored in a format that is typical for characters such as ASCII. In some embodiments, an AI algorithm/system can include integrated OCR so that, for instance, an image is sent to it and it returns characters in the image if they exist.

After the characters, words or sentences are converted to a computer format that allows for analysis, they can be compared to predetermined targeted content (e.g. library or words, acronyms, sentences) and/or analyzed by an AI system (e.g. Natural Language Processing (NLP) algorithms and model trained with a predetermined data set) with previously trained targeted content for a match or comparable match. If a match or comparable match is found (determined), then the image or video frame may be optionally obfuscated depending on the specific application and then sent (transmitted) to the monitoring user's mobile communication device. According to some embodiments, an alert (i.e. notification) may be also be sent to the monitoring user's communication device to alert the monitoring user (e.g. parent) of the incoming image or video frame(s).

Other example embodiments decipher one or more of text, characters, written words (e.g. cursive, script), numbers, special characters, sentences, messages, etc. that are imbedded or integrated into an image (i.e., part of an image) or video (i.e., part of one or more frames of video). More specifically, the text, characters, written words, numbers, special characters, sentences, messages, etc. in the image are not stored, for example, as individual characters like ASCII characters are stored in the memory of a computer, server, mobile communication device, etc. The text, characters, written words, numbers, special characters, sentences, messages, etc. are incorporated inherently into the image file itself.

Figure 24:
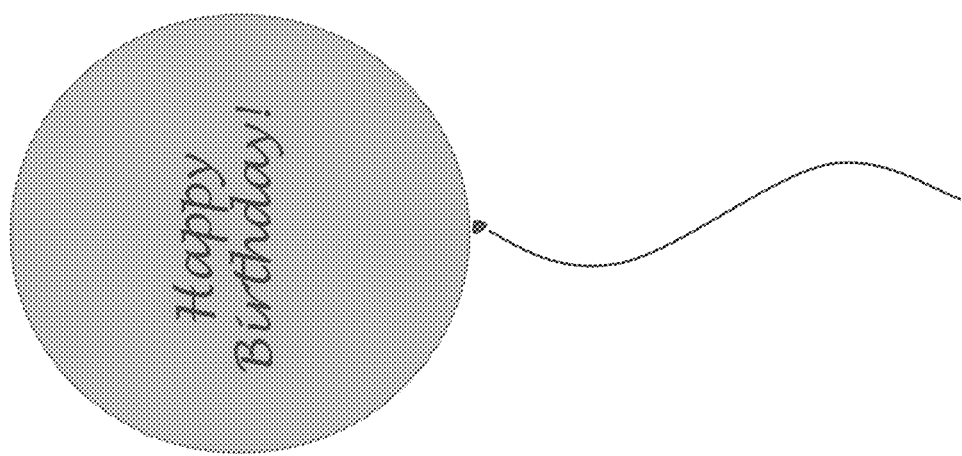
FIG. 24 shows an image/picture including embedded text for illustrating an example method.

For example, FIG. 24 shows an image/picture of a balloon that has the words "Happy Birthday" written on it (e.g., stylized). Example methods can use a combination of Artificial Intelligence (AI) and Optical Character Recognition (OCR) as shown in FIG. 23 to decipher and translate this information into characters or character strings that can be used to perform a direct match to targeted content or a comparable match to targeted content (or trained targeted content) that is stored in a format like ASCII.

Another example is processing an image from the user of a social media app that allows the user to take a picture and overlay words on or over the picture (similar to a caption). An example method uses AI technology (e.g., a CNN) and OCR technology in conjunction or cooperatively with each other. For instance, the AI technology can first be used to determine or identify that text, characters, written words, numbers, special characters, sentences, messages, etc. are in the image (picture). OCR technology can then be used to convert the text, characters, written words, numbers, special characters, sentences, messages, etc. in the image into characters (e.g. ASCII characters), words, sentences or messages, which are in turn used for comparing, matching or determining a comparable match to targeted content (or trained targeted content). The comparison may use the same or another type of AI technology for making this determination or for merely comparing each character in the translated character string to each character in the targeted content character string to identify a match.

One example application of such methods allows parents to be alerted when communications related to bullying (cyber-bullying) have occurred on a monitored mobile communication device through the use of a social media app that allows text, characters, written words, numbers, special characters, sentences, messages, etc. to be overlaid over an image or video prior to transmitting it. These social media apps can also be referred to as "image messaging media apps" and "video messaging media apps". Current examples of these types of apps include Snapchat and TikTok.

It is important to note that the order of the processing and the combination of the processes utilized for the AI and OCR in this embodiment can vary. For example, in some applications, the image may be processed with AI technology to first determine that there is in fact text, characters, written words, numbers, special characters, sentences, messages, etc. in the image. Provided the AI determines that text, characters, written words, numbers, special characters, sentences, messages, etc. do exist within the image, then OCR can be used as a secondary function to convert into characters that can be stored in a computer (e.g. ASCII format). After that, AI may be used to determine if the characters (e.g. words, acronyms, sentences, messages) have a match, comparable match or are sufficiently close match to targeted content which will create an action (e.g. an alert sent to a parent). This involves an additional analysis process. After that, another additional AI analysis process may be incorporated, which will determine if the image has targeted content not associated with the text, characters, etc. (e.g., NSFW, inappropriate content, an adolescent smoking/vaping in the image, a firearm or weapon in the image, etc.). Each of the above embodiments for identifying a direct or comparable match can be used for determining a match or comparable match for content which includes but is not limited to text, image, video, audio, combinations of text/image/video/audio or other types of electronic messages.

Some example embodiments can employ blockchain methods. By way of background, a blockchain, originally block chain, is a growing list of records, called blocks, which are linked using cryptography. Each block contains a cryptographic hash of the previous block, a timestamp, and transaction data. By design, a blockchain is resistant to modification of the data. Blockchain applications are typically implemented using a peer-to-peer architecture or in a peer-to-peer network and are also decentralized network implementations for data flow, data storage, control, etc.

A hybrid peer-to-peer network implementation of blockchain has certain advantages for example embodiments. There are both public and private blockchain implementations, and although some example embodiments lend themselves to a private blockchain implementation whereby the users who can access it are authorized, registered or invited, other embodiments can also be implemented in a public implementation. One advantage for incorporating certain embodiments via a public blockchain implementation is that it provides greater accessibility to resources and distribution of data, machine learning models and information with less opportunity for manipulation. Therefore, the implementation of both private and public blockchain for a single application of example embodiments is viable.

Some example embodiments incorporate blockchain architectures (i.e., Blockchain technology) and schemes to store some or all of the electronic communications, the status of matches or comparable matches (e.g., deep neural network model techniques for determining a comparable match) to targeted content and alerts. The data set(s) or models utilized with AI technologies or other comparison techniques like libraries, arrays or knowledge bases can also be stored using blockchain. This enables a decentralized technique that has many advantages including enhanced data security, improved traceability, increased speed and efficiency.

Some example embodiments incorporate blockchain architectures (i.e. Blockchain technology) and schemes for implementing a system or process for granting authorization ("permissioning") between two or more mobile communication devices. In some embodiments, this can include authorizing one or more monitoring mobile communication devices to receive electronic communications from a specific monitored mobile communication device.

Some example embodiments incorporate Blockchain architectures (i.e., Blockchain technology) and schemes to store information pertaining to the identity (e.g. Internet address, location, etc.) of the parties sending (transmitting) electronic communications to the user of the monitored mobile communication device. Some advantages to this approach include improved traceability and security. Other information could also be stored in a Blockchain as it relates to useful information such as, but not limited to, data flow information, network information, Internet information (e.g.

address information, URL, IP address, protocol information, routing information), control information, transaction information, etc.

Some embodiments provide the capability to analyze for targeted content (e.g., inappropriate content, offensive content, or any content of interest) through the interpreting of organized sets of data (e.g., training data) of interrelated blockchains.

There are other available types of technologies and techniques that are similar to blockchain in that they utilize blocks of information with data and pointers to associated blocks (e.g., hash) which are distributed across nodes (e.g. computers) connected by the Internet in a distributed architecture. One open source technology or technique is called Hyperledger, which can be implemented in example embodiments in the same ways as described above for blockchain. Similarly, the following non-limiting list of technologies or techniques can also be used for the example embodiments disclosed above: Corda, Quorum, Ethereum, Holochain, Ripple, Stellar, etc.

Figure 25:
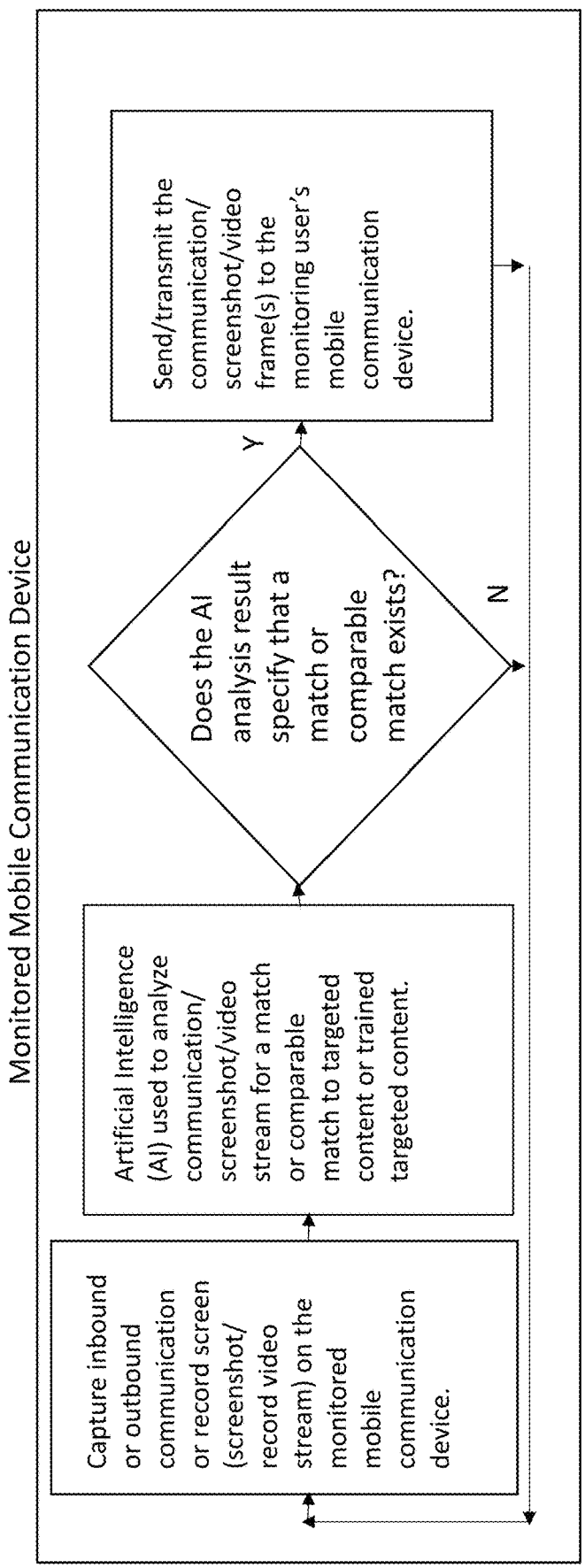
FIG. 25 shows an example method for capturing, analyzing, and transmitting an image or recording a video stream being presented, e.g., displayed, on an output interface, e.g., a screen, of a mobile communication device.

Additional features of example embodiments for monitoring mobile communication devices for targeted content or trained targeted content (e.g., images, MMS, SMS, text messages, videos, audio clips, electronic messages) will now be explained, including example features for reading or receiving electronic communications on a monitored user's mobile communication device, with reference to FIG. 25. FIG. 25 is a flowchart illustrating an example method for capturing, analyzing, and transmitting an image or recording a video stream being presented, e.g., displayed, on an output interface, e.g., a screen, of a mobile communication device.

A mobile communication device, e.g., the monitored (child) mobile communication device, captures presented images or video from a communication by performing a screenshot or recording what is displayed on the mobile communication device screen. Example capturing can be implemented on a regular basis (e.g., based on a sample rate, image capture rate, etc.) and/or based on predefined or user-defined criteria. Example methods can capture images or video that are displayed on the mobile communication device screen at a predefined time interval (synchronous scan rate), within a timeframe (asynchronous scanning), and/or based on specific criteria.

An example method can employ one or more screen capture techniques, technologies, customized or proprietary software or firmware, commercial or open source software, or any combination, executable by a processor to read the screen (e.g., take a screenshot), capture the screen or capture a continuous video stream of the monitored user's mobile communication device. Programmatically, capturing the mobile device screen can be implemented by, for instance, accessing system level functions of the operating system, standard operating system functions or calls, through software or apps running on a mobile device, API functions, by accessing and reading video memory (e.g. RAM, VRAM, DRAM, NVRAM), by accessing "working memory" where images or videos are temporarily stored, high-speed memory or through any other manifestation for capturing the contents on the screen of a mobile communication device known by someone with skill in the art. Memory can also include volatile or non-volatile types of memory.

Similarly, continuous video streams can be captured from the mobile communication device screen whereby individual or groups of video frames (images) can be used for analysis and processing. Software used for this function that is executable by a processor can be embodied in proprietary code, software developed by another party (e.g. open source software, commercially available software), or a combination.

Video memory refers to the area in memory on a processor such as a mobile device or computer where an image resides prior to being displayed on the device screen for viewing. Video memory may reside, for instance, in the RAM (Random-Access Memory), VRAM (Video RAM), DRAM (Dynamic RAM), NVRAM (Non-Volatile RAM) or other similar types of memory used to store "working data" of a mobile communication device. In addition, it is also possible to intercept or capture an image or video in digital format as it is transferred from video memory (e.g., VRAM) and prior to it being displayed on the mobile device screen. Example capturing, analysis (e.g., AI algorithmic), content processing (such as obfuscation), transmission, and other processes providing one or more functions of example embodiments can, in certain cases, be executed in parallel or as a multi-threaded application.

Referring again to FIG. 25, once an image or video stream is captured or recorded, the image or individual video frame can be presented to AI software (e.g., a CNN trained model) for analysis. Predicated on a match or comparable match (i.e., a closely related match) to targeted content or trained targeted content (e.g., via the CNN), the image or video frame can be transmitted to the monitoring user's communication device. The image or video frame may be obfuscated prior to transmission based on the application, as explained elsewhere herein.

According to some example embodiments, an alert (e.g., a notification) may be also be sent to the monitoring user's communication device to notify the monitoring user (e.g., parent) of the incoming image or video frame.

Another embodiment of this invention allows the monitoring user's mobile communication device to receive "present-day checks" of what types of content the monitored user is sending, receiving or viewing on his/her mobile communication device. The present-day check functionality provides a monitoring user (e.g., parent) a way to more actively monitor mobile communications occurring on the monitored user's mobile device (e.g., child). Note that "present-day" is not limited to a daily check (though this is possible), but can instead refer to checks within any time frame.

The present-day check examples and descriptions provided herein can additionally or alternatively enable the monitoring mobile communication device to receive incoming and outgoing electronic messages (e.g., screenshots, images) from the monitored mobile communication device that are not considered a match or comparable match to targeted content (e.g., a selfie picture not deemed to be inappropriate). For example, the present-day check feature can enable the monitoring mobile communication device (e.g., parent) to monitor what is happening on the monitored user's mobile communication device by receiving an ordinary image, screenshot, text message or other electronic communication, periodically and/or based on predefined criteria and/or on-demand.

As an illustrative example, it may be beneficial to monitor what the end user (e.g., a child) is looking at on the screen of his/her mobile communication device from time to time. Information transferred to a monitored mobile communication device but not viewed by an end user may have less value (i.e., may be less important) to a monitoring user (e.g., parent).

Figure 26:
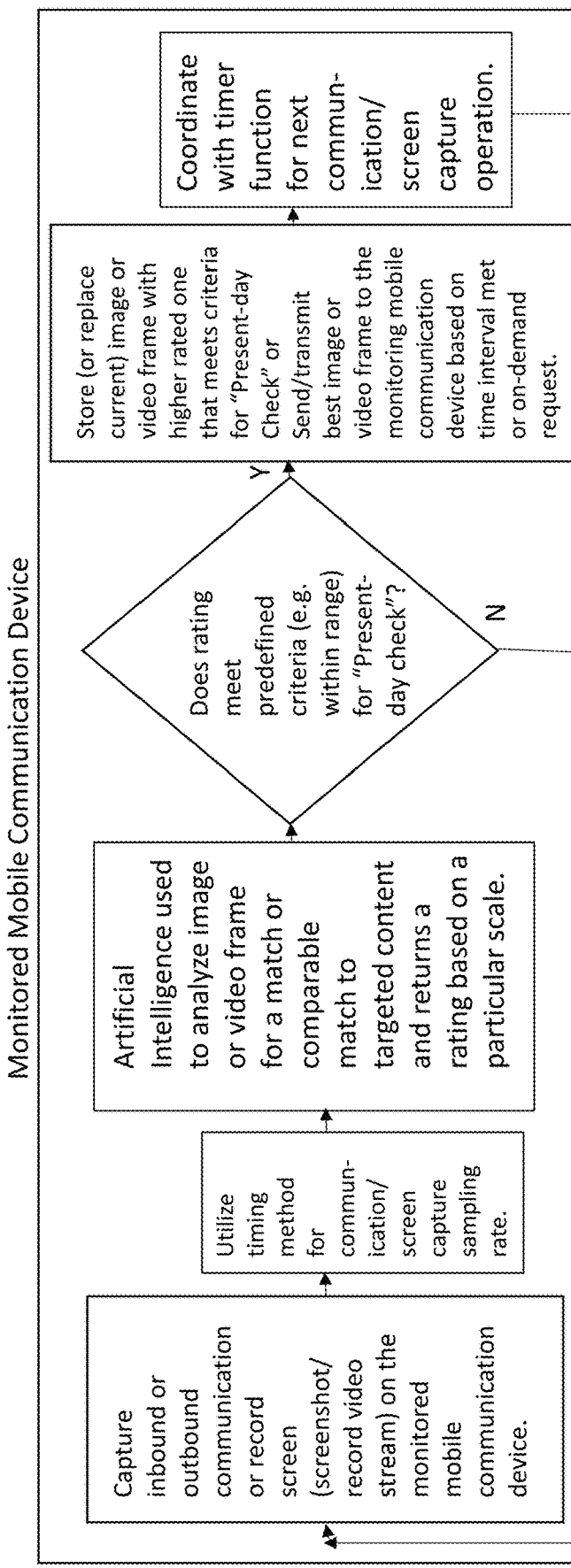
FIG. 26 shows an example present-day check method for analyzing content and transmitting the content to a monitoring user's mobile communication device.

FIG. 26 shows an example of a "present-day check" method. A screen displayed from a communication (e.g., a screenshot, video stream, inbound/outbound communication, etc.) on the monitored mobile communication device is captured or recorded, as provided above. A screenshot can be an image, such as but not limited to a "selfie" picture or merely a snapshot of what is happening on the monitored user's device screen at a particular moment in time (e.g., a snapshot of a game being played).

A timing method may be utilized for providing a screen capture sampling rate in addition to the period in which the best quality present-day check screenshot is transmitted to the monitoring user's mobile device. For instance, by conducting a screen capture at a predefined set interval (as a nonlimiting example, a screenshot taken once every second) or based on other criteria, this type of monitoring can be effective for various applications. The more frequently the screen is captured and processed, the more effective and thorough the monitoring function may be for some applications.

To analyze the content, e.g., the captured image or video frame, a content recognition algorithm/model can be implemented using AI technology or any other type of image recognition software or techniques that rate images against targeted content, as provided above. For example, content can be rated by a Convolutional Neural Network algorithm/software (CNN) for determining that an image (screenshot) has a comparable match.

Based on this determination, the analyzed content can further be rated by the example AI algorithm (or an additional AI algorithm) from, say, 1 to 100, where 100 is the most inappropriate. The specific rating (e.g., 1 to 100) can indicate how close of a match the content is to the previously defined targeted content. However, content rated lower than the rating level that indicates a good match (e.g., rating of 85 on a scale of 1 to 100) may still have meaningful value to a monitoring user, for example to provide a typical snapshot of what is happening in the life of the monitored user (e.g., present-day check).

As a nonlimiting example scale: content rated >50 may be considered to be inappropriate (e.g. NSFW—Not Safe for Work); content rated >85 may be considered to be highly inappropriate (e.g. Pornographic); content rated <20 may be considered to be appropriate (e.g. SFW—Safe for Work); and content rated between 10 and 20 may be considered likely to show a human image rather than a screenshot of something non-human (e.g. the icons on a user interface on a mobile device). Note that the above thresholds are for purposes of explanation only and can vary significantly depending on, for instance, the AI algorithm and training model used or the tolerability of the end user, etc. The scaling may vary as well (e.g., rating scale could be between 0.001 and 0.100 instead of 1 and 100, be reversed (from 100 to 1), or vary in other ways).

In some example embodiments, if the content analysis determines at least a comparable match (i.e., a closely related match) to targeted content or trained targeted content (e.g., by employing a CNN trained model), then the image or video frame may be stored on the monitored user's communication device for a future transmission based on predefined criteria. The timing, criteria and/or protocol or transmission (e.g., the number of electronic messages, images, screenshots, etc.) from the monitored mobile communication device to monitoring mobile communication device can vary substantially in, for example, the exact number of electronic messages (e.g., images, screenshots) transferred, the criteria for which electronic messages (e.g., images, screenshots) are selected, the specific timing (or randomness) of when the electronic messages (e.g., images, screenshots) are captured or are to be transmitted, the cutoff point or threshold for the rating, a score or level that qualifies an electronic messages (e.g., images, screenshots) for transmission to the monitoring mobile communication device (e.g., a rating from a CNN algorithm), etc.

In an example operation, the example application operating on the monitored user's mobile communication device may be configured to transmit only the highest rated image within a predetermined threshold range (e.g., a rating between 5 and 20 on a scale of 1 to 100), and at a set interval (e.g., transmit after every 6 hour time period). If the next image or video frame analyzed by AI has a higher rated match (i.e., a better match) or higher rated comparable match than the previous image or video frame, then it can replace the current one stored. After a predefined timeframe or in response to an on-demand request by the user of the monitoring communication device, the image or video frame can be transmitted to the monitoring user's communication device (which may or may not be obfuscated prior to transmission based on the application).

In another example embodiment, the monitored communication device may transfer one or more random pictures at a set time interval (e.g. as a nonlimiting example, every 6 hours). The device can determine which screen capture/image(s) to transfer to the monitoring communication device by storing the highest rated picture that does not exceed a specific threshold in order to insure the image was not NSFW content but is likely to have more meaningful content to the monitoring user than any random screenshot.

One way that this can be accomplished is by using AI (e.g., CNN) that was previously trained for targeted image recognition and have multiple thresholds for what is to be considered a present-day check screenshot or image versus an NSFW screenshot or image. A dead band or gap may also be implemented between the rating thresholds. One example benefit for this is that by staying under a particular threshold, for example: 20 on a scale of 1 to 100, this would allow content to be transferred that would not be deemed inappropriate or would be SFW (Safe For Work) content; for instance, with the example rating scale above the NSFW threshold would be a rating greater than 50. The screenshots or images that fall into the dead band range (or gap) can be ignored. Another non-limiting example would be for screenshots or images to be transferred without regard to a rating and be determined based on a specific time period, a random time period or any other criteria. Additionally, in example implementations of this embodiment, the screenshots or images may be optionally obfuscated (e.g., blurred). This can provide, among other things, a level of anonymity.

FIG. 27 shows example screenshots of a user interface (i.e., means by which a human and a mobile communication device or computer interact) of a monitoring user's mobile communication device. FIG. 27 shows two example views of transmitted images/screenshots, namely a thumbnail gallery view of images or electronic messages (left) and a single image view (i.e., zoomed in view of a single thumbnail image) of an image or electronic message (right). A burst thumbnail view can also be implemented, e.g., showing a plurality (as a nonlimiting example, four) images within a thumbnail with a number displayed on it that reveals the total number of images in the burst. A burst is a series of images that were taken in a short period of time. One non-limiting example where a burst of images is taken would be a video being viewed on the monitored communication device that has targeted content (e.g., pornographic video).

Additional example embodiments integrate example methods for reading or capturing content on a mobile communication device and determining if a match or a comparable match to targeted content exists with/into a surveillance or home security system. In example embodiments, any of the image recognition, video recognition, text message recognition, audio recognition and electronic communication recognition functionality disclosed above can be employed. The implementation can be standalone or integrated into existing or to-be-developed home security or surveillance systems, such as by providing suitable code (e.g., software, firmware) executable by a processor in the home security or surveillance systems for performing example methods.

One non-limiting example embodiment can provide additional functionality for alerting a user (e.g., home owner, business owner) of an inappropriate image, text message, video, audio recording, SMS, MIMS, electronic communication, etc. being transmitted into or out of their home or business via wireless, cellular, Internet, Bluetooth, or any other communication technology or medium. An example implementation of this embodiment to work in conjunction with a home security system can include, for instance, a screen (similar to that on a monitored mobile communication device) for the software to capture the images being transmitted through the electronic communications network (e.g., Internet). However, it is also possible to read these electronic messages through other means (e.g., reading video memory, input/output buffers, etc.). Thus, while current security systems safeguard against physical intrusions, example methods incorporated into a security system can safeguard against "digital intrusions".

Additional example embodiments can employ Artificial Intelligence, Machine Learning or other human cognitive function technologies or analysis functions as described above to perform the same (or similar or analogous) functions on content stored on a mobile communication device being monitored (e.g., previously stored images, videos, audio, text messages, electronic messages, etc.). This can provide, for instance, a device scan feature. Some example methods can search archived or stored data on the mobile communication device for targeted content. Example methods can additionally or alternatively be used to determine if other apps installed on the mobile communication device being monitored are inappropriate or do not meet other standards that may be harmful or otherwise of interest to a monitoring party.

The results of the scan can be posted to a report that can be transmitted (e.g., emailed) to a recipient, such as a parent. After the device can is finished, results can give the user the list of detected content, and may allow the parent to delete said content individually or in its entirety.

In some example embodiments, the Artificial Intelligence analysis process or other technologies that mimic human cognitive functions (e.g., Machine Learning algorithm/model, deep learning algorithm/model, etc.) may be incorporated to determine a variety of different targeted content. Such content need not be restricted to targeted content that may be, for example, of interest of parents when monitoring an adolescent's/child's mobile communication device. Some non-limiting examples of additional targeted content include a person smoking/vaping in the image, a firearm or weapon in the image, a person wearing a mask to conceal identity, identifying specific behavior, identifying specific person or persons, a person falling asleep while driving, a person having a seizure, a person showing signs of a specific illness or medical condition, a person being in a place that they should not be, facial expressions or body language indicating depression, facial expressions or body language indicating mental illness, facial expressions or body language indicating suicide potential, facial expressions or body language indicating anger, facial expressions or body language indicating sadness, facial expressions or body language indicating contempt, facial expressions or body language indicating confusion, facial expressions or body language indicating fear, facial expressions or body language indicating surprise, facial expressions or body language indicating excitement, etc.

Figure 28:
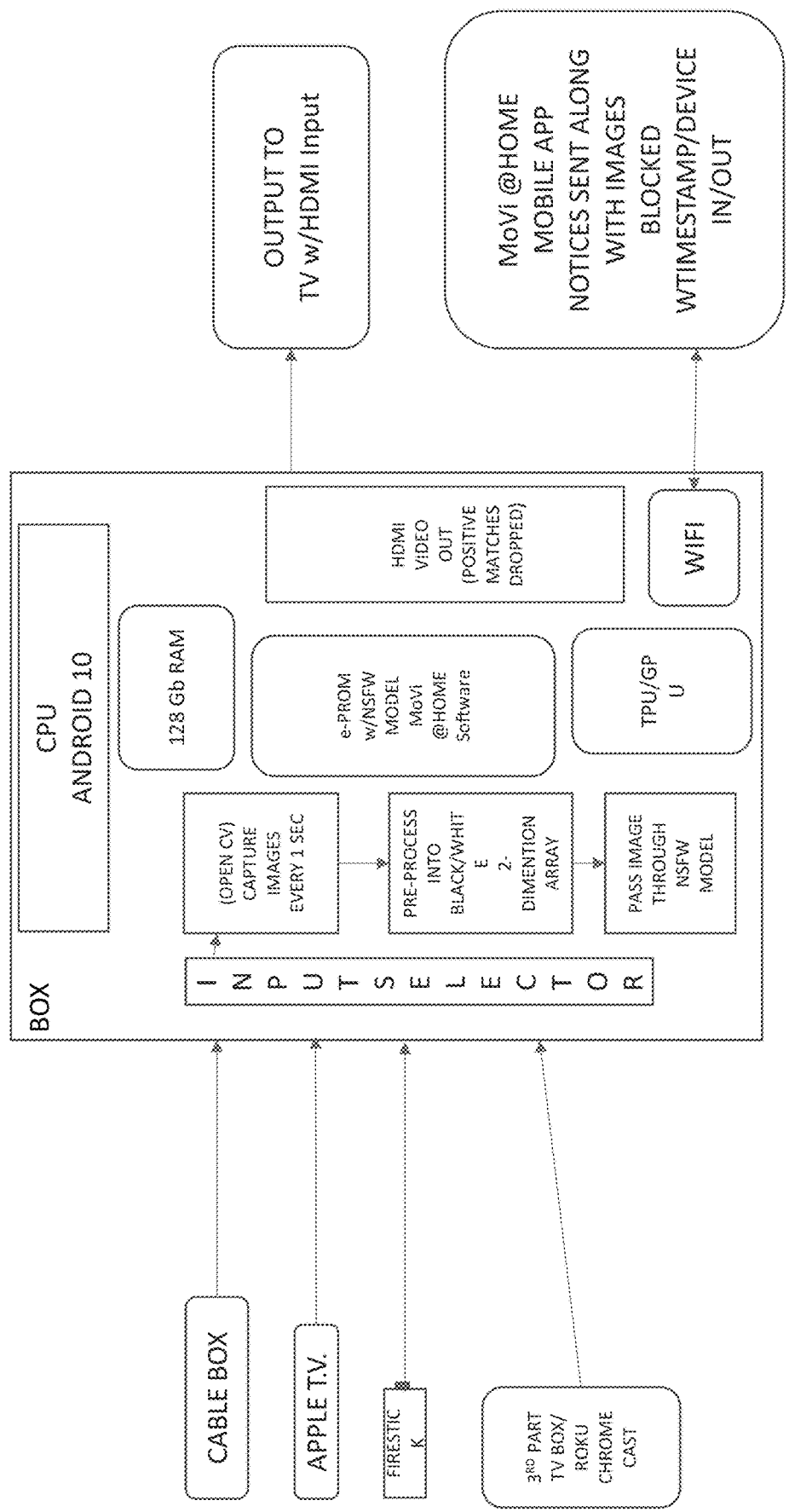
FIG. 28 shows an example computer appliance for performing example content monitoring methods.

Other example embodiments provide a computer appliance, illustrated in FIG. 28 as a "box," for performing example monitoring methods as disclosed herein. The computer appliance may be disposed between one or more content providing devices, e.g., streaming devices, cable box, etc., and an output device, such as a television or other monitor or display device. The computer appliance may be a standalone device or may be integrated into a device used to select or forward content, such as but not limited to an HDMI switch, a television or monitor front-end, an audio/video receiver, a computer, a gaming console, etc.

The example computer appliance can contain suitable hardware and software (e.g., circuitry and logic) for determining if a video stream or other input content stream that is input from outside devices, e.g., cable box, streaming devices, etc. contains any targeted content (e.g., images, videos, audio, or text deemed inappropriate for children under the age of 18). If such targeted content is determined, then the content that matches or has a comparable match can be deleted from the video or other content output stream so that they do not appear on the output device.

Determination of whether or not the content of the video or other input content stream meets this level of inappropriateness can be performed by an Artificial Intelligence algorithm with a trained model from a predetermined data set (AI). For example, this may be driven by a CNN that has been custom trained to recognize inappropriate images and words. In some embodiments, the example computer appliance can take single frames that are captured from a live or real-time video input, and format them into a digital array that the CNN can read. This array can be input to the CNN or other AI model, where a rating or series of ratings is given for each category that is inappropriate. In a nonlimiting example, ratings can be in the range of 0.001 to 0.100, where any rating over 0.050 is considered a positive match or comparable match.

As shown in FIG. 28, the computer appliance can include multiple video inputs and one or more video output (one shown in the figure). An input selector may be provided for selection among content providing devices. The example computer appliance also has Wi-Fi (or other wireless communication) capabilities in order to communicate information to a monitoring user's mobile devices or computers. Information that can be transmitted between the computer appliance and the mobile device may be transmitted done through, for instance, a peer-to-peer, hybrid peer-to-peer or hybrid peer-to-peer Cloud network that is secure and prevents any images from being stored permanently or archived online (e.g., centralized server). Images or video frames or other input content that has been determined to have a match or comparable match to targeted content (i.e., flagged content) can be forwarded to the monitoring user's mobile device along with an alert via one of the network schemes (e.g., as described herein), for instance to a mobile app residing thereon in order to present (e.g., display or otherwise indicate) the content that has been flagged. The alert may be delivered via a mobile app, a push notification or other means outside of the app itself.

In an example embodiment, the computer appliance (including plug-ins, if used) contains the necessary circuitry and executable logic to convert the video streams from input content into digital format, capture single frames of said video at fixed intervals such as (but not limited to) once every half a second, pre-process those single frames for input to the AI for analysis, determine the ratings the AI assigns to each frame and compare it to a predetermined threshold (or high & low thresholds) to see if it exceeds the threshold or is in between the high and low thresholds. If a single image or video frame (or other analyzed content) exceeds the threshold requirements, it is transmitted, e.g., via Wi-Fi and one of the network schemes (described herein) to the monitoring user's mobile device, and can be deleted (e.g., dropped) from the video stream.

An example AI model may reside on a special chip called an EPROM (Erasable Programmable Read-Only Memory), a type of memory that can be erased and reprogrammed for updated versions of the model (e.g. retrained models with new targeted content). The computer appliance may, but need not, further include specialized hardware as will be appreciated by an artisan that can be sourced to run the AI at an improved efficiency, e.g., TPU AMD GPU. The example computer appliance may also be configured to communicate with external devices such as but not limited to remote controls, or Apps or other device for allowing the observer of the TV or external monitor to select which input video stream should be used.

Example embodiments of the near real-time electronic messaging (with an example being text messaging) monitoring feature disclosed herein provide, among other things, a method for monitoring text messages or SMS occurring on one or more monitored mobile communications devices (with examples including, but not limited to, tablet PCs, laptops, gaming devices, music players, PDAs, mobile communication devices, smartphones, cell phones (e.g. children's cell phones)) by another party's monitoring mobile communications device (e.g. parental cell phone).

Other embodiments provide a method for transmitting incoming and/or outgoing video content or clips that match or reasonably match (close proximity match) a predefined video content/clip stored in a library or database on either the monitored or monitoring mobile communication device. One example use of such embodiments is to enable a parent to monitor video content for selected images, moving pictures or other video identifiers. This allows a parent to monitor incoming and outgoing video content occurring on their children's cell phone(s). Alerts can also be sent to the monitoring party's cell phone indicating when a match or close proximity match has occurred. Once the alert is recognized by the parent, they can watch the actual video content that triggered the alert from the convenience of their own cell phone or mobile communication device. In such embodiments, video content may include the audio content accompanying the video whereby either the video content and/or the audio content (similar to the method in the previous provision that monitors audio phone conversations), can be monitored for generating alerts.

Still other embodiments provide a method for transmitting only the incoming and/or outgoing text messages to a third party cell phone that are associated with one or more preselected contacts (contact names) and/or phone number(s) and/or other communicating identifier by the monitoring party (e.g. parent or guardian). This enables a parent to limit the text messages being monitored based on certain contact(s) and/or phone number(s) that they preselect.

Other example embodiments provide a method for alerting the monitoring cell phone(s) when potentially inappropriate, illegal or targeted content is detected within a text message, SMS, MMS, audio message (words communicated through voice), audio/video message, video, images, or electronic message or during a phone (audio) conversation. This includes words, acronyms, shorthand, codes, audio clips, voice excerpts, sounds, images, image snippets or other identifiers that are, or are known to have meaning that may be considered inappropriate or illegal or defined as targeted content. The application software running on the monitored device (e.g., cell phone) can have a library of words, acronyms, short hand, codes, images, image snippets, audio clips, voice excerpts, video and other identifiers stored in a database that may be illegal or considered inappropriate by a parent, guardian or society. When this type of inappropriate content is detected by the application software running on one or more of the cell phones being monitored, an alert is sent to the monitoring device (e.g., see FIG. 13) for notification purposes.

One intended use for this embodiment is to notify the user of the monitoring device, in near real-time, that the user of the monitored device may be engaged in or was engaged in inappropriate or illegal electronic communications (e.g. text message, MMS, audio message (words communicated through voice), audio/video message or electronic message). Updates to the database (library) of words, acronyms, short hand, codes, images, image snippets, audio clips, voice excerpts, video and other identifiers are (or can be) provided to the end users as part of a service model for this technology and are uploaded to the database on the monitored device (e.g., cell phone) periodically. In example embodiments herein, the method in which these alerts are executed during run-time is in a peer to peer scheme (i.e. peer to peer network architecture). That is the library of inappropriate words, acronyms, short hand, codes, images, image snippets, audio clips, voice excerpts, video and other identifiers ("Watch Words") and also taught herein as targeted content is stored on the cell phone, smartphone or mobile communication device directly. In addition, the mobile app software that evaluates the Watch Words or targeted content and receives and displays alerts is stored on the Monitored Party's or Monitoring Party's cell phones (mobile communication devices) and not on any other intermediary server.

Another embodiment is a method for monitoring electronic communications comprising the steps of:
Receiving or communicating a first electronic message from or to a third party with a first mobile communications device;
using a first application stored on the first communications device to monitor and store the first message;
using the first application to communicate a second message that is a copy of the first message or includes information describing at least some aspect of the first message to a second application that is stored on a second mobile communications device; and, using the second application to receive the second message and to display the information.

Still another embodiment is a method for monitoring electronic communications on a mobile communication device by reading the characters, text strings, images, audio and videos generated by the user ("Input Elements") and then, analyze and compare the Input Elements to or against predefined text strings, images, audio content, audio/video content and/or videos stored in a local data structure or database. In contrast to SMS and MIMS communications which utilize a wireless communications provider's network (cellular network) for transmitting and receiving communications and may use the mobile communication device's (smartphone) operating system and communication buffers (i.e. SMS buffer or MIMS buffer) to facilitate the occurrence of a SMS message or MIMS message (for example, an interrupt generated by the operating system to tell the software/app that a new SMS message was received) and the replication of such a SMS message or MIMS message (for example, the copying of a SMS message from a communication buffer (SMS buffer) to a database). In contrast, this embodiment enables the monitoring of communications to/from messaging applications (i.e. mobile apps that incorporate SMS-like functionality, MMS-like functionality or both), also referred to as Mobile Messaging Apps, that currently utilize Wi-Fi, Bluetooth or other wireless technology to connect a smartphone or mobile communication device to the Internet to transmit and receive text messages, images, audio content, audio/video content, electronic messages and videos. Example mobile apps for this are, but not limited to, WhatsApp, MessageMe, KiK, TextNow, WeChat.

Input Elements include user interactions on a mobile communication device that include, but are not limited to, entering in characters on a keyboard, on-screen keyboard or voice recognition mechanism or depressing icons on a mobile communication device that activate a picture/image to be taken and/or audio/video to be captured. In one circumstance, the input/output buffers associated with the mobile communication device's operating system is not utilized for transmitting and receiving messages, images and videos, the application software is required to analyze the users input entered in on the mobile communication device to determine the communication being transmitted. For example, this could be a text message, image, audio clip, audio/video clip, electronic message or video being transmitted over the Internet via a Wi-Fi, Bluetooth or other wireless technology connection. After analysis is performed, the communication is compared to a predefined database or data structure of text strings, images, audio clips, video clips or target content ("Target Element Data") stored on the Monitored Party's or Monitoring Party's mobile communication device (FIG. 3). The comparison to the Target Element Data may also occur on the monitoring data communication device in addition to the Target Element Data being stored on the monitoring data communication device. Provided there is a match or a close proximity match, then the communication and/or associated alert (warning) is transmitted to the mobile communication devices optionally authenticated or registered to monitor such communications. Further, the software may obtain information about applications (mobile apps) running on the monitored users' mobile communication device from a monitored user's mobile communication device's operating system. This information may be used to facilitate the parsing and analysis of text messages, images, audio and video based on previously determined communication protocols, data structure definitions, formatting definitions, services, character formatting and/or device input protocols or formats learned or known about the protocols, data structures, formats, techniques or services implemented by each specific application (mobile app).

Again, it is preferred that the example application software is intended to enable communications, most preferably during run-time, between two or more mobile communication devices (e.g. cell phones, smartphones, iPads, iPods) in a peer to peer network architecture (scheme).

Other inventive aspects provided herein include:

Aspect 1. A method for monitoring mobile communication and generating alerts associated with targeted content, the method comprising:
establishing a link between a monitoring user's mobile communication device and a monitored user's mobile communication device to receive communications for monitoring purposes;
the monitored user's mobile communication device forwarding an incoming or outgoing communication to the monitoring user's mobile communication device;
the monitored user's or monitoring user's mobile communication device generating an alert if the incoming or outgoing communication on the monitored user's mobile communication device contains targeted content; and
the monitoring user's mobile communication device providing the alert indicating that the incoming or outgoing communication contains targeted content.

Aspect 2. The method of aspect 1, wherein a monitoring user's mobile communication device is authenticated to receive communications from the monitored user's mobile communication device for monitoring purposes.

Aspect 3. The method of aspect 1, wherein the incoming or outgoing communication comprises at least one text message or SMS message.

Aspect 4. The method of aspect 1, wherein the incoming or outgoing communication comprises at least one image or MIMS message.

Aspect 5. The method of aspect 1, wherein the incoming or outgoing communication comprises at least one voice mail message.

Aspect 6. The method of aspect 1, wherein the incoming or outgoing communication comprises at least one live voice communication session or excerpt of a live voice communication session.

Aspect 7. The method of aspect 1, wherein the incoming or outgoing communication comprises at least one video clip.

Aspect 8. The method of aspect 1 further comprising: the monitoring user's mobile communication device further providing a description of the targeted content on the monitoring user's mobile communication device for review by the monitoring user.

Aspect 9. The aspect of aspect 1, wherein the incoming or outgoing communication comprises at least one electronic message.

Aspect 10. The method of aspect 1, wherein the outgoing communications transmitted (forwarded) from the monitored user's mobile communication device to the monitoring user's mobile communication device are implemented in a peer-to-peer network architecture (peer-to-peer network scheme).

Aspect 11. The method of aspect 1, wherein the forwarded communications from the monitored user's mobile communication device to the monitoring user's mobile communication device are exclusively outgoing (outbound) communications from the monitored user to one of more third parties.

Aspect 12. The method of aspect 1, wherein forwarded communications from the monitored user's mobile communication device to the monitoring user's mobile communication device are exclusively incoming (inbound) communications to the monitored user from one of more third parties.

Aspect 13. The method of aspect 1, wherein the monitored user's mobile communication device receives or transmits an electronic message comprising one or more of text messages, images, audio clips, video clips, SMS or MIMS messages;

the monitored user's mobile communication device comparing the electronic message to a list of predefined text strings, images, audio clips, or video clips previously determined to be targeted content; and predicated on a match or a comparable match, the monitored user's mobile communication device forwarding (transmitting) the electronic message to the monitoring user's mobile communication device.

Aspect 14. The method of aspect 1, wherein the monitored user's mobile communication device receives or is transmitting an electronic message comprising one or more of a text message, message, app message, image, audio recording, audio clip, video, video clip, SMS or MIMS message; and the monitored user's or monitoring user's mobile communication device comparing the electronic message to a list of predefined text strings, images, audio clips, and/or video clips previously determined to be targeted content; and predicated on a match or a comparable match, the monitored user's mobile communication device transmitting an alert to the monitoring user's communication device notifying that potential inappropriate or targeted content was detected or the monitoring user's mobile communication device generating an alert notifying that potential inappropriate or targeted content was detected.

Aspect 15. The method of aspect 1, wherein the incoming or outgoing communication resides on the monitored user's mobile communication device;

wherein the monitored user's mobile communication device presents at least a portion of a communication on an output interface of the monitored user's mobile communication device; and wherein the monitored user's mobile communication device reads into memory the presented portion of the communication in response to such presenting.

Aspect 16. The method of aspect 15, wherein the communication comprised one or more of an electronic message, text message, message, app message, image, audio recording, audio clip, video, video clip, SMS or MIMS message.

Aspect 17. The method of aspect 16, wherein the output interface comprises a display of the monitored user's mobile communication device;

wherein said presenting comprises displaying the at least a portion of the communication on the display; and wherein said reading into memory comprises performing a screen capture or screen recording of at least a portion of the display.

Aspect 18. The method of aspect 17, wherein the output interface comprises an audio output of the monitored user's mobile communication device;

wherein said presenting comprises playing the at least a portion of the communication on the audio output; and wherein said reading into memory comprises performing an audio recording or audio capture of the portion of the communication.

Aspect 19. The method of aspect 17, wherein the monitored user's communication device reads into memory the presented portion of the communication at any time that the portion is presented on the output interface.

Aspect 20. The method of aspect 1, wherein the communication comprises one or more of an electronic message, text message, message, app message, image, audio recording, audio clip, video, video clip, video frame, SMS or MIMS message; wherein, if it is determined that the communication contains the targeted content, the monitored user's mobile communication device obfuscates at least a portion of the targeted content prior to the monitored user's mobile communication forwarding the communication to the monitoring user's mobile communication device.

Aspect 21. The method of aspect 1, wherein the communication comprises one or more of an electronic message, text message, message, app message, image, audio recording, audio clip, video, video clip, video frame, SMS or MIMS message;

wherein, if it is determined that the communication contains the targeted content, the monitoring user's mobile communication device obfuscating at least a portion of the targeted content after the monitoring user's mobile communication device receives the communication from the monitored user's mobile communication device.

Aspect 22. The method of aspect 20, wherein the obfuscating comprises blurring the image, video, video clip, video frame, MMS or electronic message.

Aspect 23. The method of aspect 21, wherein the obfuscating comprises blurring the image, video, video clip, video frame, MMS or electronic message.

Aspect 24. The method of aspect 20, wherein the obfuscating comprises audibly distorting at least a portion of the audio clip.

Aspect 25. The method of aspect 20, wherein the obfuscated communication is transmitted from the monitored user's mobile communication device to the monitoring user's mobile communication device in a peer-to-peer network architecture (scheme) or a hybrid peer-to-peer network architecture (scheme).

Aspect 26. The method of aspect 21, wherein before the obfuscating the communication is transmitted from the monitored user's mobile communication device to the monitoring user's mobile communication device in a peer-to-peer network architecture (scheme) or a hybrid peer-to-peer network architecture (scheme).

Aspect 27. The method of aspect 20, wherein the obfuscated communication is transmitted via a cloud computing scheme for storage, analysis, processing and/or transmittal to the monitoring user's mobile communication device or the monitoring user's mobile communication device receives or retrieves the communication via a cloud computing scheme for obfuscating by the monitoring user's mobile communication device.

Aspect 28. The method of aspect 21, wherein before the obfuscating the communication is transmitted via a cloud computing scheme for storage, analysis, processing and/or transmittal to the monitoring user's mobile communication device or the monitoring user's mobile communication device receives or retrieves the communication via a cloud computing scheme for obfuscating by the monitoring user's mobile communication device.

Aspect 29. The method of aspect 20, wherein the obfuscated communication is stored on a server for storage, analysis, processing and/or transmittal to the monitoring user's mobile communication device or the monitoring user's mobile communication device receives or retrieves the communication from a server for obfuscating by the monitoring user's mobile communication device.

Aspect 30. The method of aspect 21, wherein before the obfuscating the communication is stored on a server for storage, analysis, processing and/or transmittal to the monitoring user's mobile communication device or the monitoring user's mobile communication device receives or retrieves the communication from a server for obfuscating by the monitoring user's mobile communication device.

Aspect 31. The method of aspect 1, further comprising:
determining whether the incoming or outgoing communication on the monitored user's mobile communication device contains targeted content;
wherein said determining employs an artificial intelligence model to analyze the incoming or outgoing communication.

Aspect 32. The method of aspect 31, wherein the communication comprises one or more of an electronic message, text message, message, app message, image, audio recording, audio clip, video, video clip, video frame, SMS or MIMS message.

Aspect 33. The method of aspect 31, wherein the determining is implemented on the monitored user's mobile communication device.

Aspect 34. The method of aspect 31, wherein the determining is implemented using a cloud-based device.

Aspect 35. The method of aspect 31, wherein the determining is implemented on a server.

Aspect 36. The method of aspect 31, wherein said determining comprises inputting at least a portion of the incoming or outgoing communication to the artificial intelligence model and providing or receiving an output indicating whether the incoming or outgoing communication on the monitored user's mobile communication device contains targeted content.

Aspect 37. The method of aspect 36, wherein the artificial intelligence model comprises a neural network model that is trained to detect targeted content.

Aspect 38. The method of aspect 37, wherein the neural network model comprises a convolutional neural network (CNN) model, and wherein the output comprises a prediction.

Aspect 39. The method of aspect 1, wherein the forwarding of the communication from the monitored user's mobile communication device to the monitoring user's mobile communication device is implemented in a hybrid peer-to-peer network architecture;
wherein the hybrid peer-to-peer architecture comprises at least one peer-to-peer network model and at least one client/server network model), and incorporates bidirectional communications.

Aspect 40. The method of aspect 1,
wherein the communication comprises one or more of an electronic message, text message, message, app message, image, audio recording, audio clip, video, video clip, video frame, SMS or MIMS message;
wherein the communication is transmitted from the monitored mobile communication device to the monitoring mobile communication device based on one or more of:
the communication being determined to meet one or more predefined criteria;
a communication being determined to contain targeted content; or
a communication being determined to contain trained targeted content using an artificial intelligence model.

Aspect 41. The method of aspect 40, wherein the communication that is determined to best meet the predefined criteria, contain targeted content, and/or contain trained targeted content is transmitted to the monitoring user's mobile communication device at a set or random time interval.

Aspect 42. The method of aspect 40, wherein the communication that is determined to best meet the predefined criteria, contain targeted content, and/or contain trained targeted content is transmitted on-demand by the user of the monitoring mobile communication device to the monitoring user's mobile communication device.

Aspect 43. The method of aspect 40, wherein at least a portion of the communication is obfuscated prior to being transmitted to the monitoring mobile communication device.

Aspect 44. The method in aspect 40, wherein the communication is transmitted from the monitored mobile communication device to the monitoring mobile communication device in a peer-to-peer network architecture or hybrid peer-to-peer network architecture.

Aspect 45. The method in aspect 40, wherein the communication is transmitted from the monitored mobile communication device to the monitoring mobile communication device via the cloud.

Aspect 46. The method in aspect 40 wherein the communication is transmitted from the monitored mobile communication device to the monitoring mobile communication device via a server.

Aspect 47. A method for monitoring mobile communication and generating alerts associated with targeted content, the method comprising:
a monitored user's mobile communication device forwarding an incoming or outgoing communication for storage and analysis;
the communication being transmitted via a cloud computing scheme to a monitoring user's mobile communication device or the monitoring user's mobile communication device retrieving the communication via the cloud computing scheme;
the monitoring user's mobile communication device generating an alert if, based on said analysis, the incoming or outgoing communication on the monitored user's mobile communication device contains targeted content; and
the monitoring user's mobile communication device providing the alert indicating that the incoming or outgoing communication contains targeted content.

Aspect 48. The method of aspect 47, wherein the communication being stored comprises at least one non-SMS text message or SMS message.

Aspect 49. The method of aspect 47, wherein the communication being stored comprises at least one image or MIMS message.

Aspect 50. The method of aspect 47, wherein the communication being stored comprises at least one voice mail message.

Aspect 51. The method of aspect 47, wherein the communication being stored comprises at least one live voice communication session or excerpt of a live voice communication session.

Aspect 52. The method of aspect 47, wherein the communication being stored comprises at least one video.

Aspect 53. The method of aspect 47 further comprising:
the monitoring user's mobile communication device further storing a description of the targeted content for transmittal to or retrieval by the monitoring user's mobile communication device for review by the monitoring user.

Aspect 54. The method of aspect 47, wherein the incoming or outgoing communication comprises at least one electronic message.

Aspect 55. The method of aspect 47, wherein the forwarded communications from the monitored user's mobile communication device are exclusively outgoing (outbound) communications from one or more third parties for transmittal to or retrieval by the monitoring user's mobile communication device.

Aspect 56. The method of aspect 47, wherein the forwarded communications from the monitored user's mobile communication device are exclusively incoming (inbound) communications from one or more third parties for transmittal to or retrieval by the monitoring user's mobile communication device.

Aspect 57. The method of aspect 47, wherein the monitored user's mobile communication device receives or transmits an electronic message comprising one or more of text messages, images, audio clips, video clips, SMS or MIMS messages;

the monitored user's mobile communication device storing the electronic message; and said analyzing associated with the stored electronic message is performed via cloud computing technologies.

Aspect 58. The method of aspect 47, wherein said analyzing comprises comparing the stored electronic message to a list of predefined text strings, images, audio clips, or video clips previously determined to be targeted content; and predicated on a match or a comparable match, the electronic message is transmitted to or retrieved by the monitoring user's mobile communication device.

Aspect 59. The method of aspect 47, wherein the monitored user's mobile communication device receives or transmits an electronic message comprising one or more of text messages, images, audio clips, video clips, SMS or MIMS messages;

the monitored user's mobile communication device storing the electronic message; and said analyzing associated with the stored electronic message is performed via cloud computing technologies.

Aspect 60. The method of aspect 47, wherein said analyzing comprises comparing the stored electronic message to a list of predefined text strings, images, audio clips, or video clips previously determined to be targeted content; and predicated on a match or a comparable match, an alert is transmitted to or retrieved by the monitoring user's mobile communication device notifying that potential inappropriate or targeted content was detected in the electronic message.

Aspect 61. The method of aspect 47 further comprising: establishing a link via the cloud computing scheme between the monitoring user's mobile communication device and the monitored user's mobile communication device to receive communications for monitoring purposes.

The summary and embodiments described herein are to be understood as being in every respect exemplary, but not restrictive, and the scope of the invention disclose herein is not to be determined strictly from the summary and embodiments, but rather as interpreted according to the full breadth permitted by the patent laws. It is understood that the embodiments described herein are only illustrative of the principles of the present invention and that various modifications may be implemented by those skilled in the art without departing from the scope and spirit of the invention. Those skilled in the art could implement various other feature combinations and additions without departing from the scope and spirit of the invention. For example, there are made embodiments that cite a single mobile communication device being monitored and it should be known that these embodiments can allow for multiple mobile communication devices being monitored. An example for which would be a parent who has two or more children that they wish to monitor mobile communications for.

As discussed throughout this document, various features and elements of some invention embodiments will be discussed and illustrated. It will be appreciated that such discussion is for the purposes of illustration only, and is not intended to limit the scope of the invention. As an example, many invention embodiments will find utility when practiced with portable phones such as cellular phones, smartphones, iPhones, Blackberry, Android, Windows phone or any mobile phone or mobile device with memory and processor running an operating system referred to herein as "cell phone" or "cell phones." Cell phone in the context of this specification also means a cellular phone with an operating system that is capable of running a mobile app. A common term (or name) for this type of phone is "smartphone". Examples of smartphones currently on the market include but are not limited to iPhone 5, Samsung Galaxy S5 and the Motorola Droid RAZR M.

It will be appreciated, however, that the inventive technology is useful with a wide variety of mobile communications devices, and cell phones with operating systems ("smartphones") are but one example. Such devices include but are not limited to portable processor based devices such as laptops, tablets, gaming devices, entertainment devices, music players, cameras, smart phones, dedicated devices, and others. Additionally, reference is made by way of illustration to texting and instant messaging. These are but two examples of electronic communications that different embodiments of the invention will find utility with. Additionally, many applications are described in the context of a parent monitoring a child. It will be appreciated that many other applications are likewise within the scope of the invention, with virtually any application in which a first user desires to monitor some aspects of communications occurring via a second user. It will be appreciated that the use of these terms herein is intended to illustrate specific embodiments only, and will be appreciated that many other devices/terms/technologies will be applicable.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method for monitoring mobile communication and generating alerts associated with targeted content, the method comprising:

establishing a link between a monitoring user's mobile communication device and a monitored user's mobile communication device to receive communications for monitoring purposes, the monitored user's mobile communication device including an application thereon;

the monitored user's mobile communication device executing the application generates an alert if an incoming or outgoing communication on the monitored user's mobile communication device contains targeted content, wherein in said incoming or outgoing communication the monitored user's mobile communication device receives or is transmitting an electronic message comprising one or more of a text message, app message, e-mail, image, audio recording, audio clip, video, video clip, SMS or MMS message; and the monitoring user's mobile communication device displaying the alert indicating that the incoming or outgoing communication contains targeted content;

wherein the monitored user's mobile communication device executing the application compares the electronic message to a list of predefined text strings, images, audio clips, and/or video clips previously determined to be targeted content;

wherein, predicated on a match or a comparable match, the monitored user's mobile communication device executing the application generates the alert, transmits the generated alert to the monitoring user's communication device notifying that potential inappropriate or targeted content was detected, and forwards at least a portion of the incoming or outgoing communication to the monitoring user's communication device;

wherein the alert transmitted by the monitored user's mobile communication device comprises an electronic message that includes text; and wherein the alert is transmitted by the monitored user's mobile communication device to the monitoring user's mobile communication device via peer-to-peer, cloud, or a third party network.

2. The method of claim 1, wherein a monitoring user's mobile communication device is authenticated to receive communications from the monitored user's mobile communication device for monitoring purposes.

3. The method of claim 1, wherein the incoming or outgoing communication comprises at least one text message or SMS message.

4. The method of claim 1, wherein the incoming or outgoing communication comprises at least one image or MMS message.

5. The method of claim 1, wherein the incoming or outgoing communication comprises at least one voice mail message.

6. The method of claim 1, wherein the incoming or outgoing communication comprises at least one live voice communication session or excerpt of a live voice communication session.

7. The method of claim 1, wherein the incoming or outgoing communication comprises at least one video clip.

8. The method of claim 1 further comprising:
the monitoring user's mobile communication device further providing a description of the targeted content on the monitoring user's mobile communication device for review by the monitoring user.

9. The method of claim 1, wherein the outgoing communications transmitted (forwarded) from the monitored user's mobile communication device to the monitoring user's mobile communication device are implemented in a peer-to-peer network architecture (peer-to-peer network scheme).

10. The method of claim 1, wherein the forwarded communications from the monitored user's mobile communication device to the monitoring user's mobile communication device are exclusively outgoing (outbound) communications from the monitored user to one of more third parties.

11. The method of claim 1, wherein forwarded communications from the monitored user's mobile communication device to the monitoring user's mobile communication device are exclusively incoming (inbound) communications to the monitored user from one of more third parties.

12. The method of claim 1, wherein,
predicated on the match or comparable match, the monitored user's mobile communication device forwards the complete electronic message to the monitoring user's mobile communication device.

13. The method of claim 1,
wherein the incoming or outgoing communication resides on the monitored user's mobile communication device;
wherein the monitored user's mobile communication device presents at least a portion of the incoming or outgoing communication on an output interface of the monitored user's mobile communication device; and
wherein the monitored user's mobile communication device reads into memory the presented portion of the communication in response to such presenting.

14. The method of claim 13, wherein the output interface comprises a display of the monitored user's mobile communication device;
wherein said presenting comprises displaying the at least a portion of the communication on the display; and
wherein said reading into memory comprises performing a screen capture or screen recording of at least a portion of the display.

15. The method of claim 14, wherein the output interface comprises an audio output of the monitored user's mobile communication device;
wherein said presenting comprises playing the at least a portion of the communication on the audio output; and
wherein said reading into memory comprises performing an audio recording or audio capture of the portion of the communication.

16. The method of claim 14, wherein the monitored user's communication device reads into memory the presented portion of the communication at any time that the portion is presented on the output interface.

17. The method of claim 1,
wherein, if it is determined that the communication contains the targeted content, the monitored user's mobile communication device obfuscates at least a portion of the targeted content prior to the monitored user's mobile communication forwarding the communication to the monitoring user's mobile communication device.

* * * * *